US011849481B2

(12) United States Patent
Zhang et al.

(10) Patent No.: US 11,849,481 B2
(45) Date of Patent: Dec. 19, 2023

(54) TECHNIQUES FOR CONFIGURING MULTIPLE-SCS AND MULTI-BEAM DIRECTION COMMUNICATIONS

(71) Applicant: QUALCOMM Incorporated, San Diego, CA (US)

(72) Inventors: Xiaoxia Zhang, San Diego, CA (US); Ananta Narayanan Thyagarajan, Bangalore (IN); Jing Sun, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/912,261

(22) Filed: Jun. 25, 2020

(65) Prior Publication Data

US 2021/0045153 A1 Feb. 11, 2021

Related U.S. Application Data

(60) Provisional application No. 62/884,609, filed on Aug. 8, 2019.

(51) Int. Cl.
*H04W 74/08* (2009.01)
*H04W 16/14* (2009.01)
(Continued)

(52) U.S. Cl.
CPC ....... *H04W 74/0808* (2013.01); *H04L 1/1614* (2013.01); *H04L 5/0094* (2013.01);
(Continued)

(58) Field of Classification Search
None
See application file for complete search history.

(56) References Cited

U.S. PATENT DOCUMENTS 10,455,488 B1 * 10/2019 Bendlin ............... H04W 16/14
2018/0098298 A1 * 4/2018 Jung ................. H04W 74/0833
(Continued)

FOREIGN PATENT DOCUMENTS

| CN | 111108765 A * | 5/2020 | ........ H04W 52/0229 |
| EP | 3772228 A1 * | 2/2021 | ............ H04W 68/02 |
| WO | WO-2019140060 A1 | 7/2019 | |

OTHER PUBLICATIONS

Translation of CN-111108765-A, filed Aug. 10, 2018 (Year: 2018).*
(Continued)

*Primary Examiner* — Faruk Hamza
*Assistant Examiner* — Cassandra L Decker
(74) *Attorney, Agent, or Firm* — QUALCOMM Incorporated

(57) ABSTRACT

Methods, systems, and devices for wireless communications in unlicensed spectrum are described. In some wireless communications systems, a user equipment may identify a service parameter configured for the user equipment for a shared radio frequency channel, such as a subcarrier spacing or beam direction for a directional beam for communications with a base station. The base station may acquire a channel occupancy time for the shared radio frequency channel. The user equipment may monitor for and receive a control message for the channel occupancy time from the base station. The control message may include an indication of service associated with the service parameter and a remaining duration of the channel occupancy time. Based on the indications, the user equipment may adapt one or more receive parameters (e.g., a monitoring periodicity, monitoring time occasions, and whether to skip monitoring) for communicating with the base station during the channel occupancy time.

23 Claims, 18 Drawing Sheets

(51) Int. Cl.
*H04W 72/0446* (2023.01)
*H04L 1/1607* (2023.01)
*H04W 24/08* (2009.01)
*H04L 5/00* (2006.01)

(52) U.S. Cl.
CPC ........... *H04W 16/14* (2013.01); *H04W 24/08* (2013.01); *H04W 72/0446* (2013.01)

(56) References Cited

U.S. PATENT DOCUMENTS

| | | | | |
|---|---|---|---|---|
| 2019/0059075 | A1* | 2/2019 | Hayashi | H04L 27/26025 |
| 2019/0149257 | A1* | 5/2019 | Jiang | H04L 5/0094 |
| | | | | 370/342 |
| 2019/0306832 | A1* | 10/2019 | Si | H04W 72/005 |
| 2019/0349885 | A1* | 11/2019 | Koskela | H04W 72/0446 |
| 2019/0373635 | A1* | 12/2019 | Yang | H04B 7/0408 |
| 2020/0053646 | A1* | 2/2020 | Kuo | H04W 48/12 |
| 2020/0053782 | A1* | 2/2020 | Zhang | H04W 74/002 |
| 2020/0100276 | A1* | 3/2020 | Oh | H04W 16/14 |
| 2020/0145972 | A1* | 5/2020 | Kwak | H04W 72/042 |
| 2020/0187204 | A1* | 6/2020 | Alriksson | H04L 5/0053 |
| 2020/0220693 | A1* | 7/2020 | Babaei | H04W 28/04 |
| 2020/0267730 | A1* | 8/2020 | Kim | H04W 72/0453 |
| 2020/0275483 | A1* | 8/2020 | Li | H04W 74/0808 |
| 2020/0322982 | A1* | 10/2020 | Wu | H04W 74/006 |
| 2020/0396686 | A1* | 12/2020 | Tiirola | H04W 52/02 |
| 2021/0218538 | A1* | 7/2021 | Myung | H04L 1/1896 |
| 2021/0298072 | A1* | 9/2021 | Oh | H04W 72/0446 |
| 2022/0104260 | A1* | 3/2022 | Wang | H04W 72/14 |
| 2022/0132563 | A1* | 4/2022 | Kim | H04L 5/0053 |

OTHER PUBLICATIONS

International Search Report and Written Opinion—PCT/US2020/039801—ISAEPO—dated Oct. 5, 2020 (193408WO).
Motorola Mobility., et al., "Feature Lead Summary for NR-U DL Signals and Channels", 3GPP Draft, 3GPP TSG RAN WG1 #97, R1-1907705, 3rd Generation Partnership Project (3GPP), Mobile Competence Centre 650, Route Des Lucioles, F-06921 Sophia-Antipolis Cedex, France, vol. RAN WG1, No. Reno, USA, May 13, 2019-May 17, 2019, May 16, 2019 (May 16, 2019), XP051739988, 24 Pages, Retrieved from the Internet: URL:http://www.3gpp.org/ftp/tsg%5Fran/WG1%5FRL1/TSGR1%5F97/Docs/R1%2D1907705%2Ezip [retrieved on May 16, 2019] p. 8: "Qualcomm" p. 9: "ZTE, Sanechips" p. 16: "ITRI". section 4; p. 8-p. 17, section 6; p. 18-p. 22.
Qualcomm Incorporated: "DL Signals and Channels for NR-U," 3GPP Draft, 3GPP TSG RAN WG1 Meeting #97, R1-1907259, 7.2.2.1.2 DL Signals and Channels for NR-U, 3rd Generation Partnership Project (3GPP), Mobile Competence Centre, 650, Route Des Lucioles, F-06921, Sophia-Antipolis Cedex, France, vol. RAN WG1, No. Reno, US, May 13, 2019-May 17, 2019, May 13, 2019 (May 13, 2019), XP051728699, 12 pages, Retrieved from the Internet: URL: http://www.3gpp.org/ftp/Meetings%5F3GPP%5FSYNC/RAN1/Docs/R1%2D1907259%2Ezip [retrieved on May 13, 2019] section 4; p. 6-p. 8 section 7; p. 9-p. 10.

* cited by examiner

TECHNIQUES FOR CONFIGURING MULTIPLE-SCS AND MULTI-BEAM DIRECTION COMMUNICATIONS

CROSS REFERENCE

The present Application for Patent claims the benefit of U.S. Provisional Patent Application No. 62/884,609 by ZHANG et al., entitled "TECHNIQUES FOR CONFIGURING MULTIPLE-SCS AND MULTI-BEAM DIRECTION COMMUNICATIONS," filed Aug. 8, 2019, assigned to the assignee hereof, and expressly incorporated by reference in its entirety.

BACKGROUND

The following relates generally to wireless communications in unlicensed spectrum, and more specifically to techniques for configuring multiple-subcarrier spacing (SCS) and multi-beam direction communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform spread orthogonal frequency-division multiplexing (DFT-s-OFDM). A wireless multiple-access communications system may include a number of base stations or network access nodes, each simultaneously supporting communication for multiple communication devices, which may be otherwise known as user equipment (UE).

In some cases, a base station may serve a number of UEs in a serving cell. The UEs may monitor for a downlink control communication from the base station, such as, at a slot level or at a mini-slot level. In some cases, the UEs may switch from using slot level monitoring to mini-slot level monitoring, or the UEs may switch from using mini-slot level monitoring to slot level monitoring. Further, in some cases, different UEs may communicate with the base station using different SCSs from one another. In some cases, the base station may communicate with different UEs that are located at different physical locations using different directional beams. Thus, the different SCSs and directional beams used for communications between UEs and the base station may complicate the UE monitoring for downlink control information.

SUMMARY

The present disclosure relates to methods, systems, devices, and apparatuses that support techniques for configuring multiple-subcarrier spacing (SCS) and multi-beam direction communications. Generally, the described techniques provide for a user equipment (UE) identifying a service parameter configured for the UE for a carrier associated with a shared radio frequency channel. The service parameter may include an SCS with which the UE may communicate with a base station or a beam direction for a directional beam with which the UE may communicate with the base station. The base station may also determine the service parameter for the UE.

The base station may perform a channel access procedure to acquire a channel occupancy time (COT) of the shared radio frequency channel. The UEs may monitor for a control message from the base station, such as a physical downlink control channel (PDCCH), and the UE may receive the control message for the COT acquired by the base station for the shared radio frequency channel. The control message may include an indication of service associated with the service parameter via the carrier. Based on the indication of service, the UE may determine communication parameters, such as a level of monitoring, with which to communicate with the base station during the COT, for example, to receive downlink communications.

A method of wireless communication at a UE is described. The method may include identifying a service parameter configured for the UE for a carrier associated with a shared radio frequency channel, receiving, from a base station, a control message associated with a COT acquired by the base station for the shared radio frequency channel, where the control message includes an indication of service associated with the service parameter via the carrier within the COT, and determining one or more communication parameters for communicating with the base station during the COT based on the indication.

An apparatus for wireless communication at a UE is described. The apparatus may include a processor, memory coupled with the processor, and instructions stored in the memory. The instructions may be executable by the processor to cause the apparatus to identify a service parameter configured for the UE for a carrier associated with a shared radio frequency channel, receive, from a base station, a control message associated with a COT acquired by the base station for the shared radio frequency channel, where the control message includes an indication of service associated with the service parameter via the carrier within the COT, and determine one or more communication parameters for communicating with the base station during the COT based on the indication.

Another apparatus for wireless communication at a UE is described. The apparatus may include means for identifying a service parameter configured for the UE for a carrier associated with a shared radio frequency channel, receiving, from a base station, a control message associated with a COT acquired by the base station for the shared radio frequency channel, where the control message includes an indication of service associated with the service parameter via the carrier within the COT, and determining one or more communication parameters for communicating with the base station during the COT based on the indication.

A non-transitory computer-readable medium storing code for wireless communication at a UE is described. The code may include instructions executable by a processor to identify a service parameter configured for the UE for a carrier associated with a shared radio frequency channel, receive, from a base station, a control message associated with a COT acquired by the base station for the shared radio frequency channel, where the control message includes an indication of service associated with the service parameter via the carrier within the COT, and determine one or more communication parameters for communicating with the base station during the COT based on the indication.

According to some aspects of the method, apparatuses, and non-transitory computer-readable medium described herein, the indication of service associated with the service parameter may indicate an absence of service associated with the service parameter during the COT, and the method, apparatuses, and non-transitory computer-readable medium described herein may further include operations, features, means, or instructions for suppressing monitoring of a control channel associated with the carrier during the COT based on the indicated absence of service associated with the service parameter during the COT. According to some aspects of the method, apparatuses, and non-transitory computer-readable medium described herein, the control message includes an indication of a duration associated with the absence of service associated with the service parameter.

According to some aspects of the method, apparatuses, and non-transitory computer-readable medium described herein, the indication of service associated with the service parameter indicates a presence of service associated with the service parameter during the COT, and the method, apparatuses, and non-transitory computer-readable medium described herein may further include operations, features, means, or instructions for adapting monitoring of a control channel associated with the carrier during the COT based on the indicated presence of service associated with the service parameter during the COT. Aspects of the method, apparatuses, and non-transitory computer-readable medium described herein may further include operations, features, means, or instructions for adapting monitoring of the control channel associated with the carrier following the COT, the adapting based on a total duration for the COT.

According to some aspects of the method, apparatuses, and non-transitory computer-readable medium described herein, the indication of service associated with the service parameter includes a bitmap including a set of bits corresponding to a set of respective slots of the COT, each bit of the set of bits indicating whether a respective slot of the set of respective slots includes service associated with the service parameter. According to some aspects of the method, apparatuses, and non-transitory computer-readable medium described herein, the service parameter includes a SCS configured for the UE for the carrier. According to some aspects of the method, apparatuses, and non-transitory computer-readable medium described herein, the service parameter includes a beam configured for the UE for the carrier. According to some aspects of the method, apparatuses, and non-transitory computer-readable medium described herein, the indication of service associated with the service parameter includes a bitmap including a set of bits corresponding to a set of beams, each bit of the set of bits indicating whether a respective beam of the set of beams may be serviced by the carrier during the COT.

According to some aspects of the method, apparatuses, and non-transitory computer-readable medium described herein, the carrier includes a first carrier and the control message may be received via a second carrier, and where the second carrier may be associated with a licensed radio frequency channel. According to some aspects of the method, apparatuses, and non-transitory computer-readable medium described herein, the indication of service associated with the service parameter includes a bitmap including a set of bits corresponding to a set of SCSs, each bit of the set of bits indicating whether a respective SCS of the set of SCSs may be serviced by the carrier during the COT.

According to some aspects of the method, apparatuses, and non-transitory computer-readable medium described herein, the control message includes an indication of a total duration for the COT. According to some aspects of the method, apparatuses, and non-transitory computer-readable medium described herein, the control message includes an indication of a remaining duration for the COT. According to some aspects of the method, apparatuses, and non-transitory computer-readable medium described herein, the control message includes an indication of a starting point for the COT.

According to some aspects of the method, apparatuses, and non-transitory computer-readable medium described herein may further include operations, features, means, or instructions for receiving, prior to receiving the control message, a signal from the base station transmitted according to the service parameter, and adapting monitoring of a control channel associated with the carrier during the COT based on receiving the signal, where receiving the control message may be based on the adapted monitoring of the control channel. According to some aspects of the method, apparatuses, and non-transitory computer-readable medium described herein, the signal includes a wake-up signal, a demodulation reference signal (DMRS), a channel state information reference signal (CSI-RS), or a combination thereof.

A method of wireless communication at a base station is described. The method may include determining, for each UE of a set of UEs served by the base station via a carrier associated with a shared radio frequency channel, a service parameter of a set of service parameters configured for the each UE for communication via the carrier, performing a channel access procedure to acquire a COT of the shared radio frequency channel, and transmitting, for each service parameter of the set of service parameters having at least one UE configured for communication using the each service parameter, a control message including an indication of service associated with the each service parameter within the COT.

An apparatus for wireless communication at a base station is described. The apparatus may include a processor, memory coupled with the processor, and instructions stored in the memory. The instructions may be executable by the processor to cause the apparatus to determine, for each UE of a set of UEs served by the base station via a carrier associated with a shared radio frequency channel, a service parameter of a set of service parameters configured for the each UE for communication via the carrier, perform a channel access procedure to acquire a COT of the shared radio frequency channel, and transmit, for each service parameter of the set of service parameters having at least one UE configured for communication using the each service parameter, a control message including an indication of service associated with the each service parameter within the COT.

Another apparatus for wireless communication at a base station is described. The apparatus may include means for determining, for each UE of a set of UEs served by the base station via a carrier associated with a shared radio frequency channel, a service parameter of a set of service parameters configured for the each UE for communication via the carrier, performing a channel access procedure to acquire a COT of the shared radio frequency channel, and transmitting, for each service parameter of the set of service parameters having at least one UE configured for communication using the each service parameter, a control message including an indication of service associated with the each service parameter within the COT.

A non-transitory computer-readable medium storing code for wireless communication at a base station is described.

The code may include instructions executable by a processor to determine, for each UE of a set of UEs served by the base station via a carrier associated with a shared radio frequency channel, a service parameter of a set of service parameters configured for the each UE for communication via the carrier, perform a channel access procedure to acquire a COT of the shared radio frequency channel, and transmit, for each service parameter of the set of service parameters having at least one UE configured for communication using the each service parameter, a control message including an indication of service associated with the each service parameter within the COT.

According to some aspects of the method, apparatuses, and non-transitory computer-readable medium described herein, for the each service parameter of the set of service parameters, the indication of service associated with the each service parameter includes a bitmap including a set of bits corresponding to a set of respective slots of the COT, each bit of the set of bits indicating whether a respective slot of the set of respective slots includes service associated with the each service parameter. According to some aspects of the method, apparatuses, and non-transitory computer-readable medium described herein, the set of service parameters corresponds to a set of SCSs.

According to some aspects of the method, apparatuses, and non-transitory computer-readable medium described herein, the set of service parameters corresponds to a set of beams. According to some aspects of the method, apparatuses, and non-transitory computer-readable medium described herein, the indication of service associated with the service parameter includes a bitmap including a set of bits corresponding to a set of respective beams, each bit of the set of bits indicating whether a respective beam of the set of beams may be serviced by the carrier during the COT.

According to some aspects of the method, apparatuses, and non-transitory computer-readable medium described herein, the carrier includes a first carrier and the control message may be transmitted via a second carrier, and where the second carrier may be associated with a licensed radio frequency channel. According to some aspects of the method, apparatuses, and non-transitory computer-readable medium described herein, the control message includes a bitmap including a set of bits corresponding to a set of SCSs, each bit of the set of bits indicating whether a respective SCS of the set of SCSs may be serviced by the carrier during the COT.

According to some aspects of the method, apparatuses, and non-transitory computer-readable medium described herein, for the each service parameter of the set of service parameters, the control message includes an indication of a total duration for the COT. According to some aspects of the method, apparatuses, and non-transitory computer-readable medium described herein, for the each service parameter of the set of service parameters, the control message includes an indication of a remaining duration for the COT. According to some aspects of the method, apparatuses, and non-transitory computer-readable medium described herein, for the each service parameter of the set of service parameters, the control message includes an indication of a starting point for the COT.

According to some aspects of the method, apparatuses, and non-transitory computer-readable medium described herein may further include operations, features, means, or instructions for transmitting, prior to transmitting the control message for the each service parameter of the set of service parameters, a signal according to the each service parameter. According to some aspects of the method, apparatuses, and non-transitory computer-readable medium described herein, the signal includes a wake-up signal, a DMRS, a CSI-RS, or a combination thereof.

DETAILED DESCRIPTION

Figure 1:
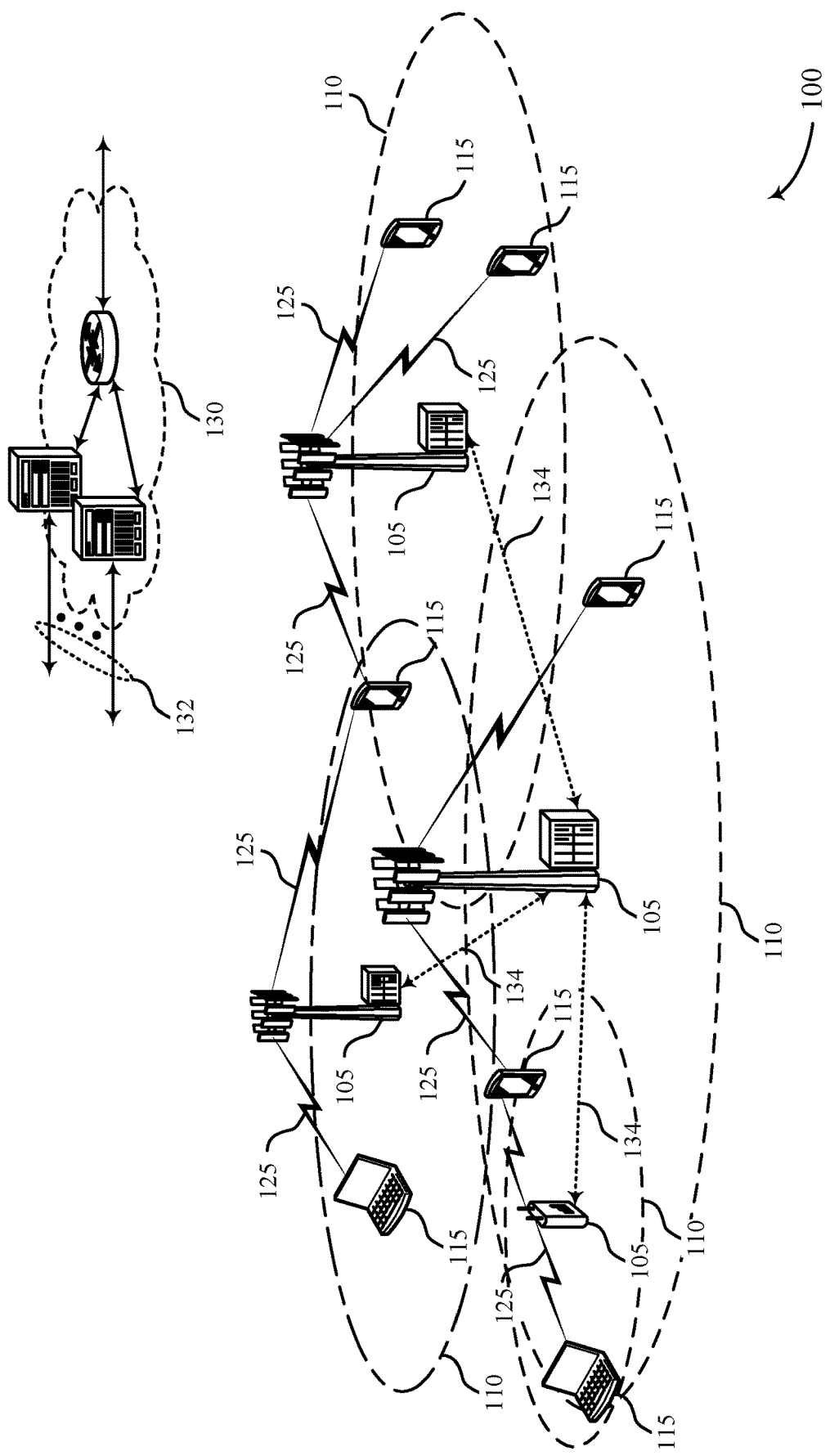
FIG. 1 illustrates aspects of a system for wireless communications that supports techniques for configuring multiple-subcarrier spacing (SCS) and multi-beam direction communications in accordance with aspects of the present disclosure.

Various aspects of the present disclosure relate to methods, systems, devices, and apparatuses that support multiple-subcarrier spacing (SCS) and multi-beam direction communications. In some aspects, a serving cell may include a base station that serves a number of UEs. The UEs may monitor for a downlink control communication from the base station, such as a physical downlink control channel (PDCCH). In different implementations, the UEs may monitor for the PDCCH at a slot level or at a mini-slot level, where a slot may include multiple mini-slots, and each mini-slot may include one or more symbols. In some cases, the base station may acquire a channel (e.g., a channel in a shared or unlicensed radio frequency spectrum band) and may transmit and/or receive within a channel occupancy time (COT). In some cases, the COT may be limited in duration by restrictions on devices using the spectrum band. In some cases, the UEs may switch from using mini-slot level monitoring to slot level monitoring during the COT after determining a start time of the COT. By switching to slot level monitoring from mini-slot level monitoring, the UE may less frequently monitor for the PDCCH, and thus may consume less power.

In some cases, one or more UEs in the serving cell may operate according to SCSs from one another. Accordingly, for a particular transmission opportunity, the base station may transmit a control message (e.g., a COT system information (COT-SI) message) to one or more of the UEs in the serving cell according to a first SCS, and UEs operating according to a different SCS may not recognize the COT SI transmission if the COT SI transmission is configured for the first SCS. Additionally or alternatively, the base station may communicate with the UEs using directional beams, and for a particular transmission opportunity, the base station may transmit a COT-SI message to one or more of the UEs in the serving cell according to a first beam direction, and thus UEs in a different direction may not receive the COT SI transmission.

Techniques are described herein by which the base station may transmit control information to the UEs in the serving cell, where the control information is configured for each of the SCSs that may be used by the UEs in the serving cell of the base station. Similarly, techniques are described herein by which the base station may transmit control information to the UEs in the serving cell using directional beams in the direction of each of the UEs in the serving cell of the base station. Additionally or alternatively, the base station may transmit an idle COT-SI message to one or more of the UEs in the serving cell of the base station, where the idle COT-SI message may indicate to one or more of the UEs that the SCS and/or beam index of the UE may not be served during a corresponding transmission opportunity. In this way, the base station may allow the UEs to enter a lower power mode (e.g., not monitoring for control messages) during the transmission opportunity.

According to the techniques described herein, in some cases an anchor carrier may be used to provide information to one or more UEs that indicates the SCSs and/or the beam indexes and an associated time duration (e.g., a transmission opportunity and/or an additional amount of time), where the information indicates the SCSs and/or the beam indexes that may be used or not used during the time duration. Techniques are further described herein by which the base station may transmit a signal (e.g., a reference signal or wake-up signal) to one or more UEs that identifies an upcoming downlink transmission burst in a corresponding transmission opportunity. Additionally or alternatively, the base station may transmit to the UEs a common preamble for all SCSs, where the common preamble may include, in some cases, a bitmap of served and/or non-served SCSs and an indication of a duration of the associated transmission opportunity. Accordingly, non-served UEs may not monitor for communications during the transmission opportunity, thus conserving power at the UEs.

Aspects of the disclosure are initially described in the context of a wireless communications system. Aspects of transmission timelines and a process flow are then provided in accordance with some aspects of the disclosure. Aspects of the disclosure are further illustrated by and described with reference to apparatus diagrams, system diagrams, and flowcharts that relate to techniques for configuring multiple-SCS and multi-beam direction communications.

FIG. 1 illustrates aspects of a wireless communications system 100 that supports techniques for configuring multiple-SCS and multi-beam direction communications in accordance with aspects of the present disclosure. The wireless communications system 100 includes base stations 105, UEs 115, and a core network 130. In some aspects, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. According to some aspects, each base station 105 may provide communication coverage for a macro cell, a small cell, a hot spot, or other types of cells, or various combinations thereof. In some aspects, a base station 105 may be movable and therefore provide communication coverage for a moving geographic coverage area 110. In some aspects, different geographic coverage areas 110 associated with different technologies may overlap, and overlapping geographic coverage areas 110 associated with different technologies may be supported by the same base station 105 or by different base stations 105. The wireless communications system 100 may include systems such as a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some aspects, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some aspects, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some aspects, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some aspects, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. According to some aspects, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some aspects, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. According to some aspects, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some aspects, base station 105 or UE 115 may be equipped with multiple antennas, which may be used to employ techniques such as transmit diversity, receive diversity, multiple-input multiple-output (MIMO) communications, or beamforming. According to some aspects, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, in some cases, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one aspect, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some aspects, the beam direction associated with transmissions along a single beam direction may be determined based on a signal that was transmitted in different beam directions. According to some aspects, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. According to some aspects, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some aspects, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. According to some aspects, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on a SCS or a frequency band of operation. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. According to some aspects, a carrier of a communication link 125 may include a portion of a radio frequency spectrum band that is operated according to physical layer channels for a given radio access technology. Each physical layer channel may carry user data, control information, or other signaling. A carrier may be associated with a predefined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some aspects, signal waveforms transmitted over a carrier may be made up of multiple sub-carriers (e.g., using multi-carrier modulation (MCM) techniques such as orthogonal frequency-division multiplexing (OFDM) or discrete Fourier transform spread OFDM (DFT-s-OFDM)).

The organizational structure of the carriers may be different for different radio access technologies (e.g., LTE, LTE-A, LTE-A Pro, NR). According to some aspects, communications over a carrier may be organized according to TTIs or slots, each of which may include user data as well as control information or signaling to support decoding the user data. A carrier may also include dedicated acquisition signaling (e.g., synchronization signals or system information (SI), etc.) and control signaling that coordinates operation for the carrier. In some aspects (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, such as using time-division multiplexing (TDM) techniques, frequency-division multiplexing (FDM) techniques, or hybrid TDM-FDM techniques. In some aspects, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some aspects the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some aspects, each served UE 115 may be configured for operating over portions or all of the carrier bandwidth. In other aspects, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and SCS are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some aspects, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and SCS may allow for the use of eCC across multiple spectrums. In some aspects, NR shared spectrum may increase spectrum utilization and spectral efficiency, specifically through dynamic vertical (e.g., across the frequency domain) and horizontal (e.g., across the time domain) sharing of resources.

A serving cell may include a base station 105 that serves a number of UEs 115, such as a number of UEs within a geographic coverage area 110 associated with a corresponding base station 105. The UEs 115 may monitor for a downlink control communication from the base station 105, such as a PDCCH. In different implementations, the UEs 115 may monitor for the PDCCH at a slot level or at a mini-slot level, where a slot may include multiple mini-slots, and each mini-slot may include one or more symbols. In some cases, the base station 105 and the UE 115 may be configured with a COT that defines an amount of time that the UE 115 is to occupy a channel within a particular transmission opportunity.

In some cases, the UEs 115 may switch from using slot level monitoring to mini-slot level monitoring, or the UEs 115 may switch from using mini-slot level monitoring to slot level monitoring. According to some aspects, a UEs 115 may switch from using mini-slot level monitoring to slot level monitoring after a start of a transmission opportunity, and the UE 115 may continue to use slot level monitoring until an end of the transmission opportunity, at which point the UE 115 may switch back to mini-slot level monitoring. By switching to slot level monitoring, the UE 115 may less frequently monitor for the PDCCH, and thus may consume less power. In some cases, the base station 105 may indicate the start of the transmission opportunity to the UE 115 in a further (e.g., earlier) control message, such as an earlier PDCCH, a group common PDCCH, a SI message (e.g., a COT-SI message, that is, an SI message associated with a particular COT), and/or a wake-up signal. Similarly, in some cases, the base station 105 may indicate the end of the transmission opportunity to the UE 115 in a further control message, such as a PDCCH, an SI message (e.g., a COT-SI message), and/or a wake-up signal.

In some cases, one or more of the UEs 115 in the serving cell may operate according to different SCSs from one another. Accordingly, for a particular transmission opportunity, the base station 105 may transmit a COT-SI message to one or more of the UEs 115 in the serving cell according to a first SCS, and thus UEs 115 operating according to a second, different SCS may not recognize the COT SI transmission if the COT SI transmission is configured particularly for the first SCS. According to some aspects, if the transmission opportunity is to be fully the first SCS (e.g., 15 kilohertz (kHz)), a UE 115 operating according to a second SCS (e.g., 30 kHz) may not detect the COT SI transmission, and thus the UE 115 may not switch from mini-slot level monitoring to slot level monitoring for the corresponding transmission opportunity, and would not realize the power savings of this switch for the duration of the transmission opportunity.

In some cases, the base station 105 may communicate with the UEs 115 using directional beams, where the base station 105 may use beams in different beam directions to communicate with the UEs 115 in different physical locations. Accordingly, for a particular transmission opportunity, in a similar manager described for different SCSs, the base station 105 may transmit a COT-SI message to one or more of the UEs 115 in the serving cell according to a first beam direction, and thus UEs 115 configured for receiving a second, different beam direction may not receive the COT SI transmission. Thus, the UE 115 may not switch from mini-slot level monitoring to slot level monitoring for the corresponding transmission opportunity, and similarly would not realize the power savings of this switch for the duration of the transmission opportunity.

Further, in some cases, to save power outside of a COT, a base station may transmit a signal, such as a wake-up signal or reference signal (e.g., a demodulation reference signal (DMRS) or a PDCCH or preamble, etc.), to the UE 115 that may indicate to the UE 115 the upcoming COT of the transmission opportunity. Based on this signal, the UE 115 may switch from mini-slot level monitoring to slot-level monitoring before the transmission opportunity, thus realizing power savings for that duration. However, when different UEs 115 are configured with different SCSs, the UEs 115 may not correctly receive the signal, and thus may not realize these power savings.

Accordingly, techniques are described herein by which the base station 105 may transmit control information to the UEs 115 in the serving cell, where the control information is configured for each of the SCSs that may be used by the UEs 115 in the serving cell of the base station 105. Similarly, techniques are described herein by which the base station 105 may transmit control information to the UEs 115 in the serving cell using directional beams in the direction of each of the UEs 115 in the serving cell of the base station 105. Additionally or alternatively, the base station may transmit an idle COT-SI message to one or more of the UEs 115 in the serving cell of the base station 105, where the idle COT-SI message may indicate to one or more of the UEs 115 that the SCS and/or beam index (e.g., corresponding to an indexed beam direction) of the UE 115 is not served during a corresponding transmission opportunity. In this way, the base station 105 may silence the UEs 115, thus providing power savings for the silenced UEs 115 that would not monitor for communications during the transmission opportunity.

According to the techniques described herein, in some cases an anchor carrier may be used to provide information to one or more UEs 115 that indicates the SCSs and/or the beam indexes and an associated time duration (e.g., a transmission opportunity and/or an additional amount of time), where the information indicates the SCSs and/or the beam indexes that may and may not be used during the time duration. Techniques are further described herein by which the base station 105 may transmit a signal (e.g., a reference signal or a wake-up signal) to one or more UEs 115 that identifies to the UEs 115 an upcoming downlink transmission burst in a corresponding transmission opportunity. According to some aspects, the base station 105 may transmit a wake-up signal indicating served SCSs and/or beam directions, and/or the wake-up signal may indicate the SCSs and/or beam directions that may not be served during the transmission opportunity. Additionally or alternatively, the base station 105 may transmit to the UEs 115 a common preamble for all SCSs, where the common preamble may include, in some cases, a bitmap of served and/or non-served SCSs and an indication of a duration of the associated transmission opportunity. Accordingly, non-served UEs 115 may not monitor for communications during the transmission opportunity, thus conserving power at the UEs 115.

Figure 2:
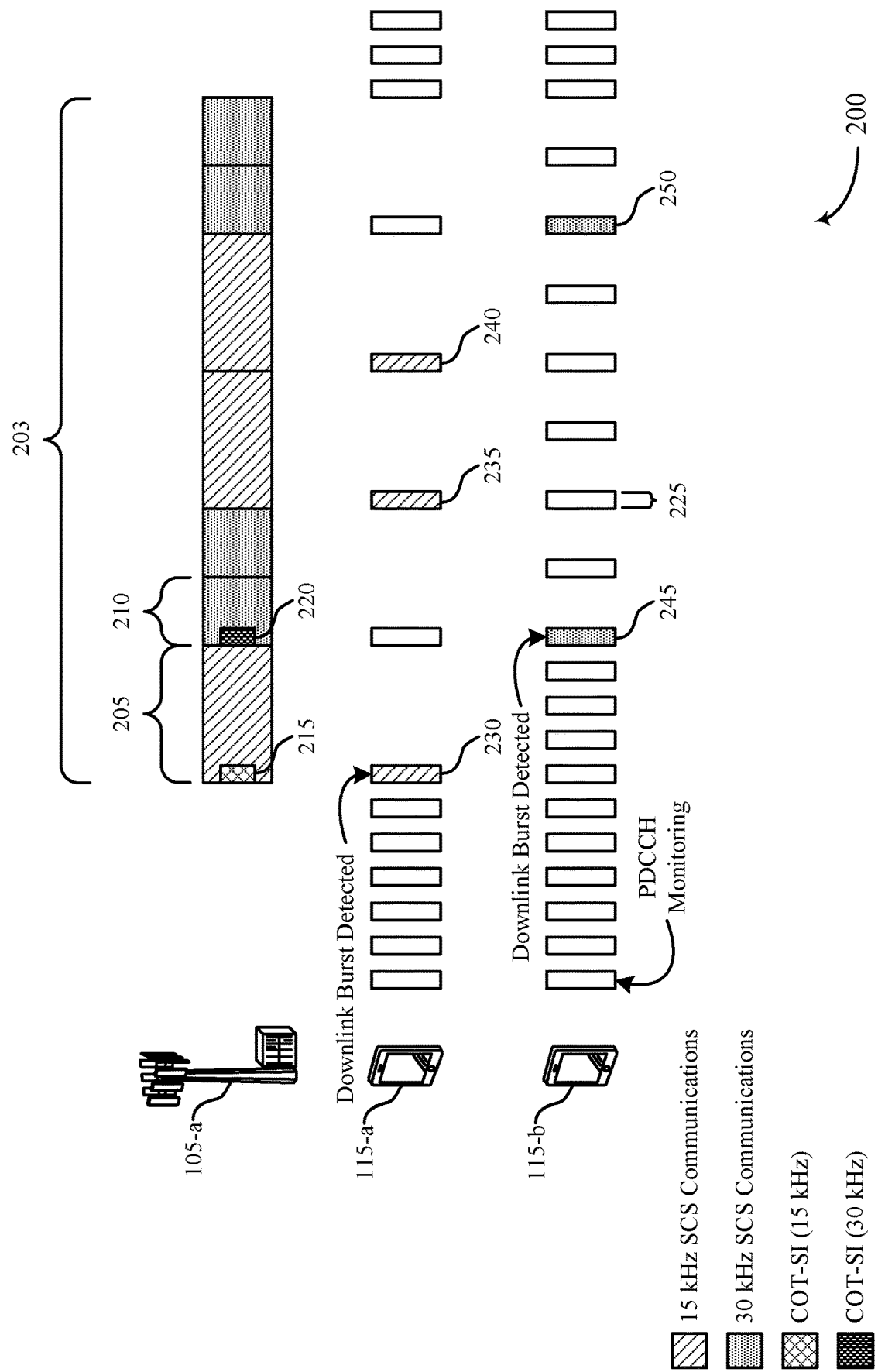
FIG. 2 illustrates aspects of a transmission timeline that supports techniques for configuring multiple-SCS and multi-beam direction communications in accordance with aspects of the present disclosure.

FIG. 2 illustrates aspects of a transmission timeline 200 that supports techniques for configuring multiple-SCS and multi-beam direction communications in accordance with aspects of the present disclosure. In some aspects, the transmission timeline 200 may implement aspects of the wireless communications system 100, as described with reference to FIG. 1. The transmission timeline 200 may include operations performed by a base station 105-a, a first UE 115-a, and second UE 115-b. Each of the base station 105 and the UEs 115 may be examples of the corresponding devices as described with reference to FIG. 1. The first UE 115-a and the second UE 115-b may be in a serving cell of the base station 105.

The transmission timeline 200 shows a transmission opportunity 203 including a number of slots 205 that are configured with a first duration for a first SCS (e.g., 15 kHz) and a number of slots 210 that are configured with a second duration for a second SCS (e.g., 30 kHz). In some cases, for a particular transmission opportunity 203, the base station 105-a may transmit a control message, such as a COT-SI, to one or more UEs 115 (including, e.g., all UEs 115 of the serving cell of the base station 105-a).

In some cases, a COT-SI message may include one or more fields for each of a start time (e.g., a starting point) the COT, a total duration of the COT, a remaining duration of the COT, a slot format indication (e.g., indicating whether corresponding symbols of the COT are configured for uplink or downlink communications). The control message may indicate to the UEs 115 a monitoring periodicity, one or more monitoring time occasions, and whether to skip monitoring for a time period (e.g., for a remaining duration of the COT). According to some aspects, the control message may indicate to the UE 115 to switch to slot level monitoring (e.g., from mini-slot level monitoring). For example, during a first slot 205 of the transmission opportunity 203, the base station 105-a may transmit a control message 215, such as a COT-SI, for UEs 115 configured for 15 kHz SCS communications. Similarly, during the next slot 210 of the transmission opportunity 203, the base station 105-a may transmit a control message 220, such as a COT-SI, for UEs 115 configured for 30 kHz SCS communications.

As is shown in the transmission timeline 200, the UEs 115 may monitor for communications (e.g., a PDCCH) from the base station 105-a during a number of monitoring periods 225. According to some aspects, the first UE 115-a (e.g., configured for communications using a 15 kHz SCS) may first monitor at a mini-slot level until the monitoring period 230 during which the UE 115-a may receive the 15 kHz SCS control message 215 from the base station 105-a. Based on the control message 215, the UE 115-a may switch to slot level monitoring. While the base station 105-a may also transmit the control message 220 to the UE 115-a, the UE 115-a may not detect the control message 220, as the control message 220 may be configured for 30 kHz SCS communications. Following slot level monitoring, the UE 115-a may detect the 15 kHz SCS communications during the slots that are configured for 15 kHz SCS downlink burst transmissions, in some cases, during the monitoring period 235 and the monitoring period 240. After the duration of the transmission opportunity 203, the UE 115-*a* may then return to mini-slot level monitoring.

Similarly, the second UE 115-*b* may also first monitor at a mini-slot level until monitoring period 245. While the base station 105-*a* may transmit the control message 215, the UE 115-*b* may not detect the control message 215, as the control message 215 may be configured for 15 kHz SCS communications. Thus, the UE 115-*b* may not receive the signaling to switch monitoring levels. In the monitoring period 245, however, the UE 115-*b* may receive the 30 kHz SCS control message 220 from the base station 105-*a*. Based on the control message 220, the UE 115-*b* may switch to slot level monitoring (e.g., according to the duration of the 30 kHz SCS slots 210). Following slot level monitoring, the UE 115-*b* may detect the 30 kHz SCS downlink burst communications during the slots that are configured for 30 kHz SCS transmissions, such as in the monitoring period 250. After the duration of the transmission opportunity 203, the UE 115-*b* may then return to mini-slot level monitoring.

Figure 3:
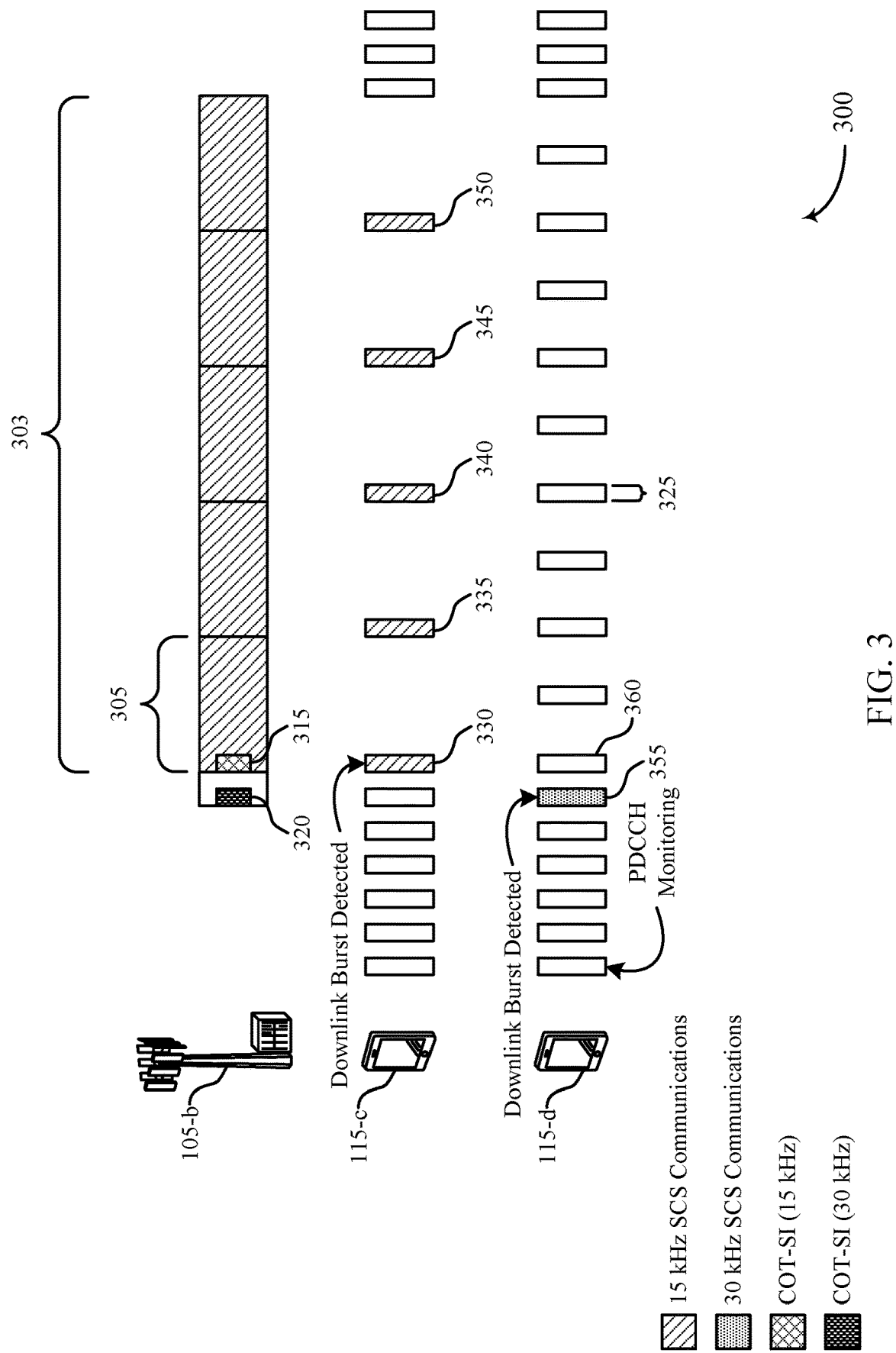
FIG. 3 illustrates aspects of a transmission timeline that supports techniques for configuring multiple-SCS and multi-beam direction communications in accordance with aspects of the present disclosure.

FIG. 3 illustrates aspects of a transmission timeline 300 that supports techniques for configuring multiple-SCS and multi-beam direction communications in accordance with aspects of the present disclosure. In some aspects, the transmission timeline 300 may implement aspects of the wireless communications system 100, as described with reference to FIG. 1. The transmission timeline 300 may include operations performed by a base station 105-*b*, a first UE 115-*c,* and second UE 115-*d*. Each of the base station 105 and the UEs 115 may be examples of the corresponding devices as described with reference to FIG. 1. The first UE 115-*c* and the second UE 115-*d* may be in a serving cell of the base station 105. In the case of the transmission timeline 300, the base station 105-*b* may be configured particularly for downlink transmissions using a 15 kHz SCS during a transmission opportunity 303.

That is, the transmission timeline 300 shows the transmission opportunity 303 including a number of slots 305 that are configured with a first duration for a first SCS (e.g., 15 kHz). In some cases, for a particular transmission opportunity 303, the base station 105-*b* may transmit a control message, such as a COT-SI, to one or more UEs 115 (including, e.g., all UEs 115 of the serving cell of the base station 105-*b*). As similarly described herein, the control message may indicate to the UEs 115 to switch to slot level monitoring (e.g., from mini-slot level monitoring). According to some aspects, during a first slot 305 of the transmission opportunity 303, the base station 105-*b* may transmit a control message 315, such as a COT-SI, for UEs 115 configured for 15 kHz SCS communications. Because the transmission opportunity 303 is not configured for 30 kHz SCS communications, the base station 105-*b* may transmit a control message 320, such as a COT-SI, prior to the first slot 305 for UEs 115 configured for 30 kHz SCS communications.

As is shown in the transmission timeline 300, the UEs 115 may monitor for communications (e.g., a PDCCH) from the base station 105-*b* during a number of monitoring periods 325. According to some aspects, the first UE 115-*c* (e.g., configured for communications using a 15 kHz SCS) may first monitor at a mini-slot level until the monitoring period 330 during which the UE 115-*c* may receive the 15 kHz SCS control message 315 from the base station 105-*b*. Based on the control message 315, the UE 115-*c* may switch to slot level monitoring. While the base station 105-*b* may also transmit the control message 320 to the UE 115-*c* prior to the transmission opportunity 303, the UE 115-*c* may not detect the control message 320, as the control message 320 may be configured for 30 kHz SCS communications, whereas the UE 115-*c* may be configured for 15 kHz SCS communications. Following slot level monitoring, the UE 115-*c* may detect the 15 kHz SCS communications during the slots configured for 15 kHz SCS downlink burst transmissions, such as in the monitoring period 335, the monitoring period 340, the monitoring period 345, and the monitoring period 350. After the duration of the transmission opportunity 303, the UE 115-*c* may then return to mini-slot level monitoring.

The second UE 115-*d* may also first monitor at a mini-slot level until monitoring period. Prior to the transmission opportunity 303, and in the monitoring period 355, the UE 115-*d* may receive the 30 kHz SCS control message 320 from the base station 105-*b*. Based on the control message 320, the UE 115-*d* may switch to slot level monitoring at a next monitoring period 360 following the monitoring period 355 during which the UE 115-*d* received the control message 320. However, because the base station 105-*b* may be configured particularly for downlink transmissions using a 15 kHz SCS during the transmission opportunity 303, the UE 115-*d* may not identify or receive any further downlink communications during the transmission opportunity 303. After the duration of the transmission opportunity 303, the UE 115-*d* may then return to mini-slot level monitoring.

Figure 4:
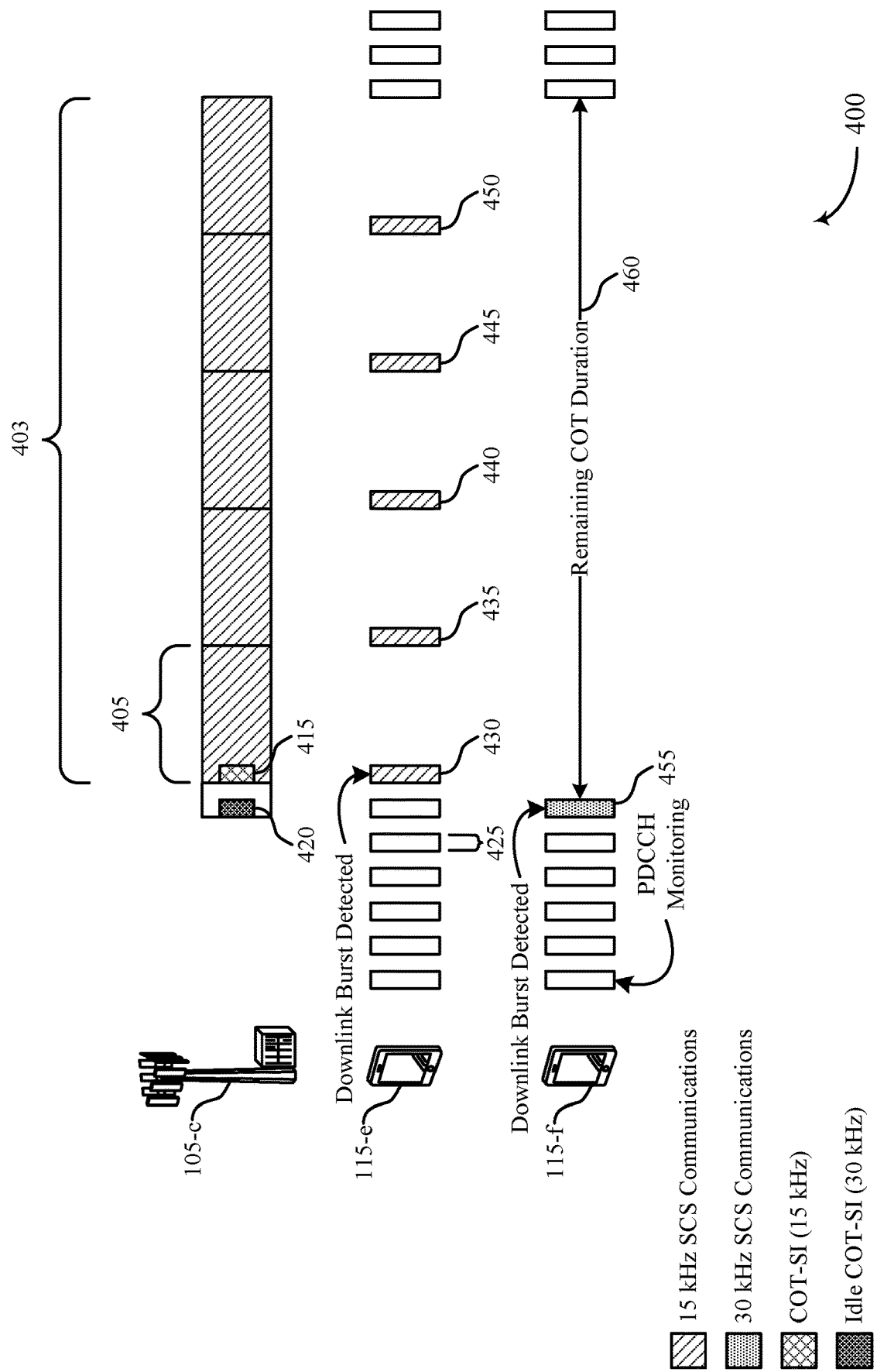
FIG. 4 illustrates aspects of a transmission timeline that supports techniques for configuring multiple-SCS and multi-beam direction communications in accordance with aspects of the present disclosure.

FIG. 4 illustrates aspects of a transmission timeline 400 that supports techniques for configuring multiple-SCS and multi-beam direction communications in accordance with aspects of the present disclosure. In some aspects, the transmission timeline 400 may implement aspects of the wireless communications system 100, as described with reference to FIG. 1. The transmission timeline 400 may include operations performed by a base station 105-*c*, a first UE 115-*e*, and second UE 115-*f*. Each of the base station 105 and the UEs 115 may be examples of the corresponding devices as described with reference to FIG. 1. The first UE 115-*e* and the second UE 115-*f* may be in a serving cell of the base station 105. In the case of the transmission timeline 400, the base station 105-*c* may be configured particularly for downlink transmissions using a 15 kHz SCS during a transmission opportunity 403.

In some cases, as shown in the transmission timeline 400 of FIG. 4, the base station 105-*c* may transmit an idle control message 420 (e.g., an idle COT-SI message) to one or more of the UEs 115 in the serving cell of the base station 105. The idle control message 420 may indicate to one or more of the UEs 115 (e.g., the UE 115-*f*) that the SCS (or, e.g., a beam index corresponding to a beam direction of the UE 115-*f*, as further described herein) of the UE 115 is not served during the transmission opportunity 403. In some cases, the idle control message 420 may be a one bit indication added to or included in a corresponding control message. In some cases, the idle control message 420 may further indicate an additional silencing duration following the transmission opportunity 403 (or, alternatively, a total silencing duration in place of the duration of the transmission opportunity 403) that the UE 115-*f* may remain in a low power state (e.g., in a case in which the base station 105-*c* knows that the base station 105-*c* will not transmit downlink communications using the 30 kHz SCS for an extended period of time).

According to some aspects, the transmission timeline 400 shows the transmission opportunity 403 including a number of slots 405 that are configured with a first duration for a first SCS (e.g., 15 kHz). The base station 105-*c* may transmit a control message, such as a COT-SI, to one or more UEs 115 (including, e.g., all UEs 115 of the serving cell of the base station 105-*c*). As similarly described herein, the control message may indicate to the UEs 115 to switch to slot level monitoring (e.g., from mini-slot level monitoring). According to some aspects, during a first slot 405 of the transmission opportunity 403, the base station 105-*c* may transmit a control message 415, such as a COT-SI, for UEs 115 configured for 15 kHz SCS communications. Because the transmission opportunity 403 is not configured for 30 kHz SCS communications, the base station 105-*c* may transmit the idle control message 420 prior to the first slot 405 for UEs 115 configured for 30 kHz SCS communications.

As is shown in the transmission timeline 400, the UEs 115 may monitor for communications (e.g., a PDCCH) from the base station 105-*c* during a number of monitoring periods 425. According to some aspects, the first UE 115-*e* (e.g., configured for communications using a 15 kHz SCS) may first monitor at a mini-slot level until the monitoring period 430 during which the UE 115-*e* may receive the 15 kHz SCS control message 415 from the base station 105-*c*. Based on the control message 415, the UE 115-*e* may switch to slot level monitoring. While the base station 105-*c* may also transmit the idle control message 420 to the UE 115-*e* prior to the transmission opportunity 403, the UE 115-*e* may not detect the idle control message 420, as the idle control message 420 may be configured for 30 kHz SCS communications, whereas the UE 115-*e* may be configured for 15 kHz SCS communications. Following slot level monitoring, the UE 115-*e* may detect the 15 kHz SCS communications during the slots configured for 15 kHz SCS downlink burst transmissions, such as in the monitoring period 435, the monitoring period 440, the monitoring period 445, and the monitoring period 450. After the duration of the transmission opportunity 403, the UE 115-*e* may then return to mini-slot level monitoring.

The second UE 115-*f* may also first monitor at a mini-slot level until monitoring period. Prior to the transmission opportunity 403, and in the monitoring period 455, the UE 115-*f* may receive the idle control message 420 from the base station 105-*c*. The idle control message may indicate a duration of a silencing COT for the associated SCS (here, 30 kHz), shown as a remaining COT duration 460. Based on the idle control message 420, the UE 115-*f* may stop monitoring until the end of the current transmission opportunity 403 according to the remaining COT duration 460 signaled in the idle control message 420. After the remaining COT duration 460 and the transmission opportunity 403, the UE 115-*f* may then return to mini-slot level monitoring. Additionally or alternatively, the idle control message 420 may include a bitmap indicating whether corresponding SCSs are to be served for each of the slots 405 of the remaining COT duration 460. Accordingly, the UE 115-*f* may monitor the slots 405 of the remaining COT duration 460 as given by respective indications in the bitmap for the corresponding SCS of the UE 115-*f*.

In some implementations, such as with reference to any of FIGS. 2 through 4, the base station 105 may communicate with the UEs 115 using directional beams to communicate with served UEs 115. That is base station 105 may use beams in different beam directions to communicate with served UEs 115 in different physical locations. Accordingly, for a particular transmission opportunity, in a similar manner described for different SCSs, the base station 105 may transmit a control message to one or more of the UEs 115 in the serving cell using a first beam direction, and UEs 115 in a different second direction may not receive the control transmission. As similarly described for different SCSs with reference to FIGS. 2 through 4, UEs 115 that receive the control message may switch from mini-slot level monitoring to slot level monitoring for the corresponding transmission opportunity, and UEs 115 that do not receive the control message may not switch from mini-slot level monitoring to slot level monitoring.

Accordingly, in addition or alternatively to the SCS dependent control messages described herein, in some cases the base station 105 may transmit a control message (e.g., a COT-SI message) in each beam direction of UEs 115 that are served by the base station 105, or are to be served by the base station 105 during the corresponding transmission opportunity. In some cases, the control message may be an idle control message (e.g., as similarly described for different SCSs with reference to FIG. 4), and base station 105 may transmit the idle control message (e.g., an idle COT-SI message) in each beam direction of UEs 115 that are not to be served by the base station 105 during the corresponding transmission opportunity.

In some cases, the base station 105 may include in the idle control message a bitmap of beam indexes, where each bit of the bitmap may indicate whether or not corresponding beam directions are to be served in the corresponding transmission opportunity. In some cases, different UEs 115 may be physically located close enough to each other such that a UE 115 that is not intended to receive a message transmitted in a particular direction may still receive the transmitted message due to the closeness in beam directions to the respective UEs 115 (e.g., a beamforming used for the directional beams may not be sufficiently sharp to fully nullify other UEs 115 near an intended target UE 115). Accordingly, by including the bitmap of beam indexes in the control message, the base station 105 may explicitly indicate the beam direction of each of the UEs 115 and whether a beam direction associated with a given UE 115 is to be served in the corresponding transmission opportunity. In some cases, the base station 105 may transmit the control message including the bitmap of beam indexes in all directions, which may facilitate non-served UEs 115 to stop monitoring for the duration of the corresponding transmission opportunity, thus conserving power at the non-served UEs 115. In some cases, as similarly described herein with respect to different SCSs, the control message may indicate an additional silencing duration following the transmission opportunity (or, alternatively, a total silencing duration in place of the duration of the transmission opportunity) that non-served UEs 115 are to remain silenced (e.g., in a case in which the base station 105 knows that the base station 105 will not transmit downlink communications to the UEs 115 in particular beam directions for an extended period of time).

In some implementations (e.g., in a wireless communications system implementing unlicensed band communications such as NR-unlicensed (NR-U)), an anchor carrier (e.g., in a licensed frequency band) may be used to provide information to one or more UEs 115 that indicates the SCSs and/or the beam indexes and an associated time duration (e.g., a transmission opportunity and/or an additional or total amount of time). According to some aspects, a transmission on the anchor carrier may include a bitmap indicating whether SCSs and/or beam indexes are to be served for the corresponding transmission opportunity (and/or a corresponding silencing duration that may include the next COT as well as one or more subsequent COTs). Accordingly, in some cases, UEs 115 of each different SCS and each different beam direction may receive the information indicating whether or not the UE 115 will be served, and non-served UEs 115 may stop monitoring for downlink communications, thus conserving power, until the end of the associated transmission opportunity and/or silenced time period.

Figure 5:
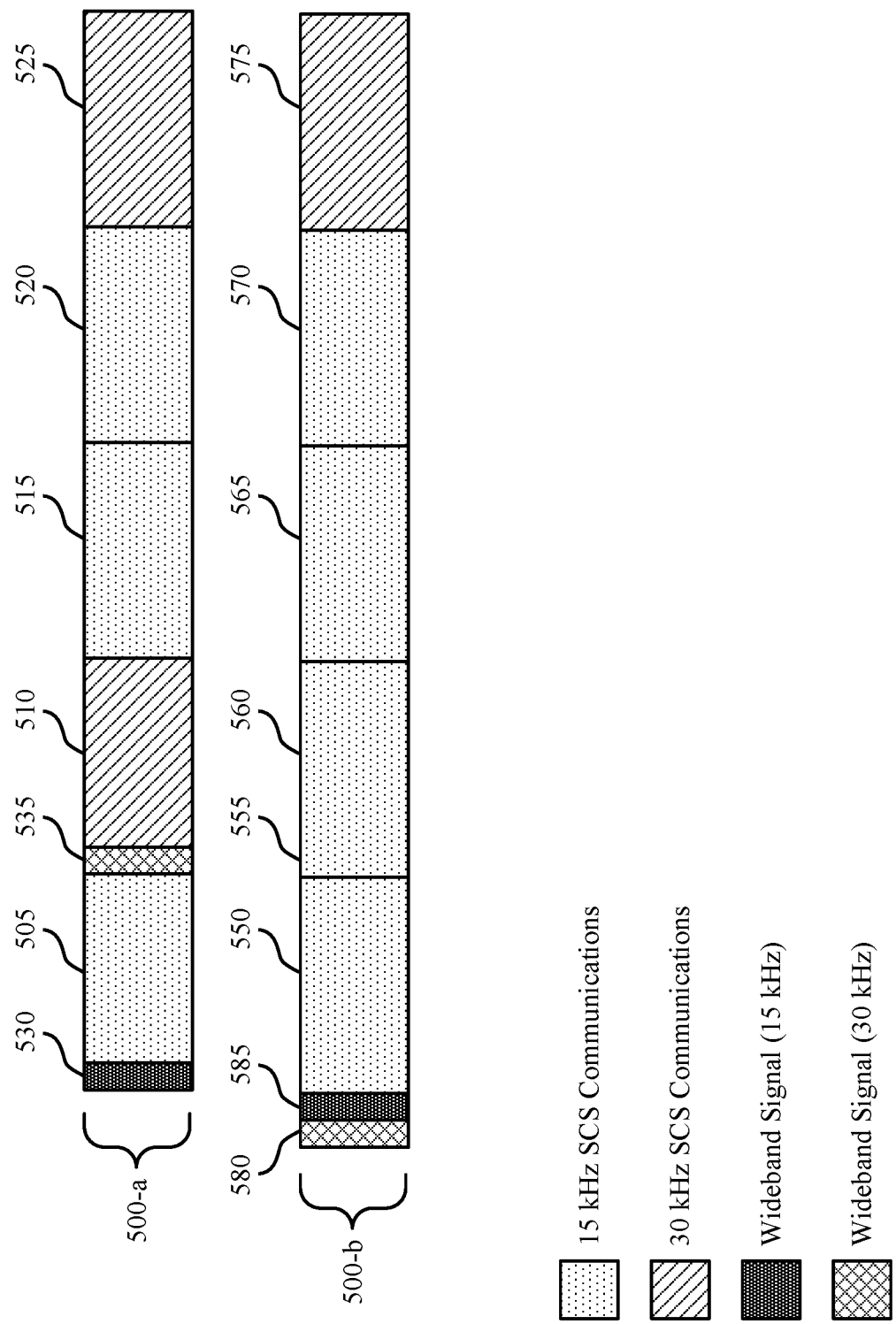
FIG. 5 illustrates aspects of transmission timelines that support techniques for configuring multiple-SCS and multi-beam direction communications in accordance with aspects of the present disclosure.

FIG. 5 illustrates aspects of transmission timelines 500 that support techniques for configuring multiple-SCS and multi-beam direction communications in accordance with aspects of the present disclosure. In some aspects, the transmission timeline 500 may implement aspects of the wireless communications system 100, as described with reference to FIG. 1. The transmission timelines 500 show a first transmission timeline 500-a and a second transmission timeline 500-b, each including time resources allocated for different types of communications between a base station and one or more UE in a serving cell of the base station, which may be examples of the corresponding devices as described with reference to FIG. 1. The transmission timelines 500 of FIG. 5 illustrate some aspects in which a base station may transmit a signal (e.g., a reference signal and/or wake-up signal) to one or more UEs that identifies to the UEs an upcoming downlink transmission burst. Further, while the communication procedures described herein may be described with reference to different SCSs, it is to be understood that similar procedures may be analogously used for different beam directions, as discussed herein.

In some cases, a first SCS (e.g., a 15 kHz SCS) may be served in a current COT (e.g., only the first SCS may be served, and a second or further SCSs may not be served). In such cases, the base station may transmit one or more reference signals for the first SCS in the COT, where the reference signal may indicate to served UEs (e.g., UEs configured to communicate using the first SCS) a downlink transmission burst for that SCS in the COT. In this way, non-served UEs (e.g., UEs configured to communicate using a second SCS, e.g., a 30 kHz SCS) may not detect the start of the COT. Alternatively, the base station may also transmit one or more reference signals to the non-served UEs, which may indicate to the non-served UEs to, in some cases, switch from mini-slot level monitoring to slot level monitoring to conserve power. In this case, the base station may further transmit a control message (e.g., a COT-SI message, an idle COT-SI message, etc.) to the non-served UEs to indicate to the non-served UEs a time at which the non-served UEs may switch back to mini-slot level monitoring for other subsequent communications.

Alternatively, multiple SCSs may be support for the current COT (e.g., the COT may include communications with UEs configured to communicate using a 15 kHz SCS and UEs configured to communicate using a 30 kHz SCS). The transmission timelines 500 show examples for such situations in which multiple SCSs are supported.

The first transmission timeline 500-a of FIG. 5 shows five slots configured for communications with UEs, including a first slot 505, a second slot 510, a third slot 515, a fourth slot 520, and a fifth slot 525. As shown by the first transmission timeline 500-a, the first slot 505, the third slot 515, and the fourth slot 520 may be configured for communications with UEs using a first SCS, such as 15 kHz. As also shown by the first transmission timeline 500-a, the second slot 510 and the fifth slot 525 may be configured for communications with UEs using a second SCS, such as 30 kHz. In some cases, the base station may transmit a reference signal (e.g., a wideband DMRS) the UEs of each served SCS.

According to some aspects, at the beginning of the first slot 505 configured for communications with UEs using the first SCS, the base station may transmit a first reference signal 530 (e.g., a wideband DMRS, e.g., using a 15 kHz SCS) to the corresponding UEs. The first reference signal 530 may indicate to the UEs configured for communications using the first SCS that the base station is to transmit a downlink transmission burst in the first slot 505, the third slot 515, and the fourth slot 520 using the first SCS. Based on the first reference signal 530, the UEs may monitor for downlink transmissions during these slots. Similarly, at the beginning of the second slot 510 configured for communications with UEs using the second SCS, the base station may transmit a second reference signal 535 (e.g., a wideband DMRS, e.g., using a 30 kHz SCS) to the corresponding UEs. The second reference signal 535 may indicate to the UEs configured for communications using the second SCS that the base station is to transmit a downlink transmission burst in the second slot 510 and the fifth slot 525 using the second SCS. Based on the second reference signal 535, the UEs may monitor for downlink transmissions during these slots.

Additionally or alternatively, as shown in the second transmission timeline 500-b of FIG. 5, five slots may be configured for communications with UEs, including a first slot 505, a second slot 510, a third slot 515, a fourth slot 520, and a fifth slot 525. As shown by the second transmission timeline 500-b, each of the first slot 505, the second slot 510, the third slot 515, and the fourth slot 520 may be configured for communications with UEs using a first SCS, such as 15 kHz. As also shown by the first transmission timeline 500-a, the fifth slot 525 may be configured for communications with UEs using a second SCS, such as 30 kHz. In some cases, the base station may transmit a wake-up signal to all of the UEs (e.g., both the UEs configured to communicate using the first SCS and the UEs configured to communicate using the second SCS) before a start of the downlink communications.

According to some aspects, before the beginning of the first slot 550 configured for downlink communications, the base station may transmit a wake-up signal 580 using the first SCS to wake up the UEs configured to communicate using the first SCS. The base station may further, before the beginning of the first slot 550 configured for downlink communications, the base station may transmit a wake-up signal 585 using the second SCS to wake up the UEs configured to communicate using the second SCS. The wake-up signals may indicate to the UEs to begin monitoring for downlink transmissions. In some cases, the wake-up signals may not include duration information. Thus, at some point during a transmission opportunity, the base station may transmit further signaling (e.g., a COT-SI, information carried on an anchor carrier, etc.) to the UEs including a duration that the UEs are to monitor for transmissions (e.g., a wake-up signal monitoring period).

Additionally or alternatively, the base station may transmit a common preamble (e.g., a time domain preamble) to the UEs of the serving cell of the base station to indicate information for upcoming downlink communications with the base station. That is, before the start of a downlink transmission burst, base station may transmit a common time domain preamble using each SCS with which the UEs served by the base station may be configured to communicate. The preamble may be independent of SCS, and may be a fixed time domain waveform such that the preamble may be detected by UEs configured to communicate using any SCS. According to some aspects, the base station may transmit such a periodic waveform (e.g., with a period of 8.33 microseconds) on each second or fourth tone (e.g., for 30 and 15 kHz SCSs, respectively). The UEs may detect the preamble and, based on the preamble detection, change a PDCCH monitoring level, such as from mini-slot level monitoring to slot level monitoring, and thus may achieve power savings from relatively less frequent monitoring. Additionally or alternatively, an SCS detected by a UE based on the preamble (e.g., according to a pattern or contents of the preamble) may indicate to the UE to stop monitoring for transmissions during the COT (e.g., based on the SCS for which the UE is configured being different than the detected SCS). In some cases, the preamble may further include information indicating a remaining duration and/or a total duration of the COT.

In some cases, the base station may transmit different periodic preamble patterns for different SCSs. That is, the base station may transmit the preamble using a first pattern for a first SCS (e.g., for a 15 kHz SCS) and may transmit the preamble using a second pattern for a second SCS (e.g., for a 30 kHz SCS). Accordingly, a UE receiving the preamble may identify an associated SCS based on the pattern of the preamble. In some cases, the base station may periodically transmit the preamble using a first period (e.g., 8.33 microseconds) when serving a first SCS (e.g., 15 kHz) and may periodically transmit the preamble using a second period (e.g., 16.66 microseconds) when serving a second SCS (e.g., 30 kHz). In some cases, the base station may periodically transmit the preamble using one period (e.g., 8.33 microseconds) when serving each SCS, but may use different transmission patterns (e.g., using different sets of time, frequency, and/or spatial resources) corresponding to different SCSs.

Additionally or alternatively, a transmitted preamble may use a first SCS (e.g., 15 kHz), and alternate tones may carry a payload including additional contents. In some cases, UEs operating according to different SCSs (e.g., both of UEs configured to communicate using a 15 kHz SCS and a 30 kHz SCS) may decode the contents of the payload, such as with a CRC protection. The payload may include one or more: a set of UEs or SCSs for UEs that are to be served in a current transmission opportunity; whether non-served UEs may turn off for a duration, and a length of such a duration; a duration (e.g., a total duration and/or a remaining duration) of the current COT; a COT structure (e.g., whether symbols are uplink or downlink, pause durations, etc.); a cell identifier; an indication of cell group uplink random access channel (RACH) procedures that may be allowed in a COT; a trigger for a RACH procedure or other grant (e.g., other two-stage grants); and other like information.

Figure 6:
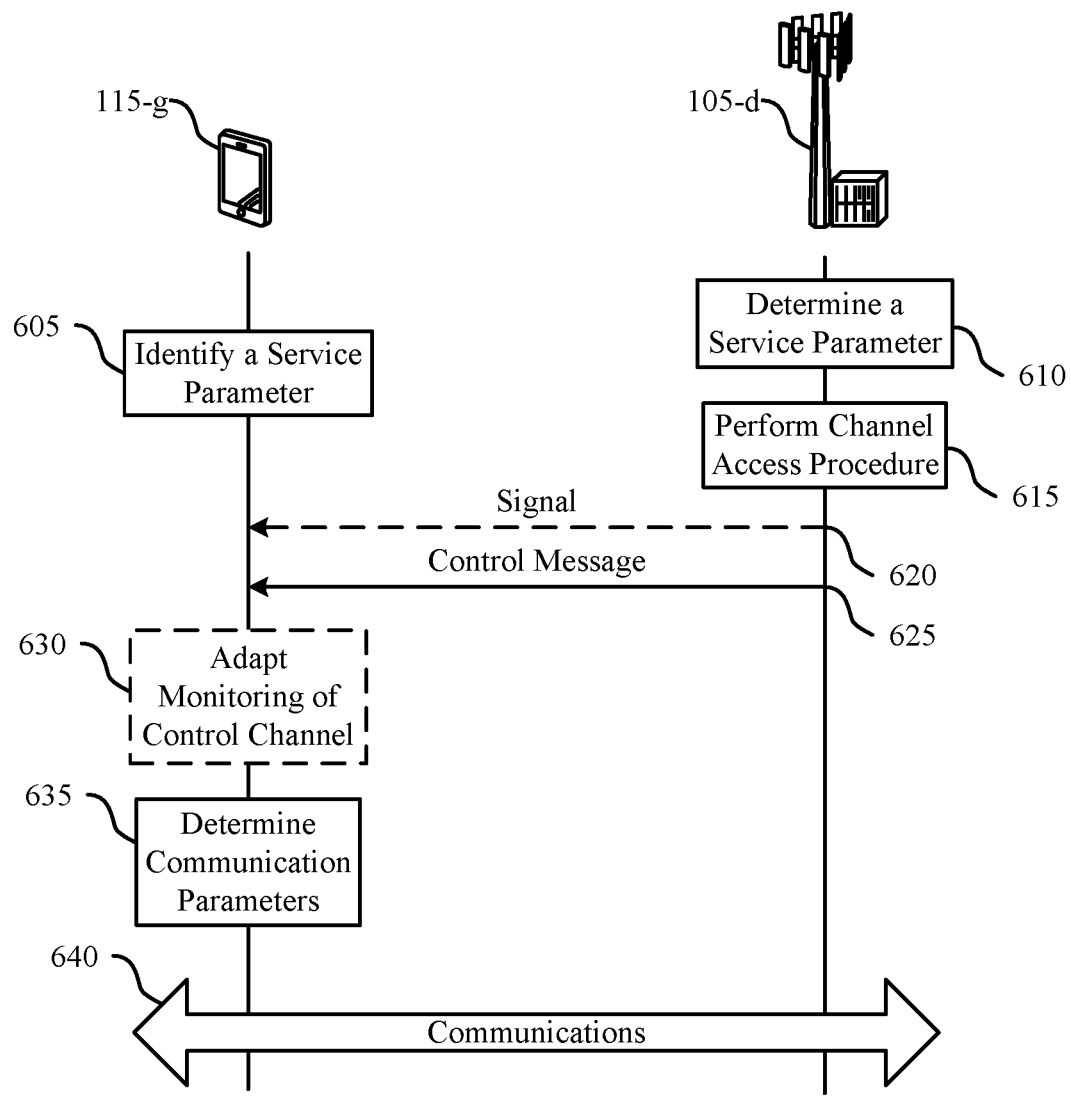
FIG. 6 illustrates aspects of a process flow that supports techniques for configuring multiple-SCS and multi-beam direction communications in accordance with aspects of the present disclosure.

FIG. 6 illustrates aspects of a process flow 600 that supports techniques for configuring multiple-SCS and multi-beam direction communications in accordance with aspects of the present disclosure. In some aspects, process flow 600 may be implemented by aspects of the wireless communications system 100, as described with reference to FIG. 1. The process flow 600 may include a base station 105-*d* and a UE 115-*g*, which may be examples of the corresponding devices described with reference to FIG. 1. Alternative examples of the following may be implemented, where some steps are performed in a different order than described or are not performed at all. In some cases, steps may include additional features not mentioned below, or further steps may be added.

At 605, the UE 115-*g* may identify a service parameter configured for the UE 115-*g* for a carrier associated with a shared radio frequency channel. The service parameter may include a SCS configured for the UE 115-*g* for the carrier and/or a beam configured for the UE 115-*g* for the carrier.

At 610, the base station 105-*d* may determine for each UE 115 of a set of UEs 115 served by the base station 105-*d* via a carrier associated with a shared radio frequency channel, a service parameter of a number of service parameters configured for each UE 115 for communication via the carrier. In some cases, the determined service parameter may similarly include the SCS configured for the UE 115-*g* for the carrier and/or the beam configured for the UE 115-*g* for the carrier.

At 615, the base station 105-*d* may perform a channel access procedure to acquire a COT of the shared radio frequency channel.

At 620, the base station 105-*d* may transmit to the UE 115-*g*, and the UE 115-*g* may receive from the base station 105-*d*, a signal according to the service parameter. In some cases, the signal may include a common PDCCH, a COT-SI message, or a UE-specific control channel, which the UE 115-*g* may detect, in some cases, when using mini-slot level monitoring. Additionally or alternatively, the signal may include one or more of a wake-up signal, a DMRS, and/or a channel state information reference signal (CSI-RS).

At 625, the base station 105-*d* may transmit a control message associated with the COT acquired by the base station 105-*d*, in some cases, via the channel access procedure performed at 615, for the shared radio frequency channel. The control message may be received by the UE 115-*g* (e.g., during mini-slot level monitoring). The control message may include an indication of service associated with the service parameter via the carrier within the COT. The control message may be transmitted via a common downlink control channel and may be a COT-SI message. Alternatively, the control message may be transmitted via a UE-specific control channel. In some cases, the control message may include an indication of a total duration for the COT, an indication of a remaining duration for the COT, and/or an indication of a starting point for the COT. In some cases, the control message may include an indication of a duration associated with an absence of service associated with the service parameter. In some cases, the carrier may include a first carrier, and the UE 115-*g* may receive the control message via a second carrier, where the second carrier may be associated with a licensed radio frequency channel.

In some cases, the indication of service associated with the service parameter may include a bitmap including a number of bits corresponding to a number of respective slots of the COT, and each bit of the number of bits may indicate whether a respective slot of the number of respective slots includes service associated with the service parameter. In some cases, the indication of service associated with the service parameter may include a bitmap including a number of bits corresponding to a number of beams, and each bit of the number of bits may indicate whether a respective beam of the number of beams is serviced by the carrier during the COT. In some cases, the indication of service may indicate which beam is serviced in each slot of the COT. In some cases, the indication of service associated with the service parameter may include a bitmap including a number of bits corresponding to a number of SCSs, and each bit of the number of bits may indicate whether a respective SCS of the number of SCSs is serviced by the carrier during the COT.

At 630, the UE 115-*g* may adapt monitoring of a control channel associated with the carrier during the COT based on receiving a signal, such as the signal received at 620 or the control message received at 625. In some cases, the UE 115-*g* may adapt the monitoring of the control channel prior to receiving the control message (e.g., based on receiving the signal at 620), and the UE 115-*g* may receive the control message based on the adapted monitoring of the control channel.

At 635, the UE 115-g may determine one or more communication parameters for communicating with the base station 105-d (e.g., a level of monitoring for PDCCH, a starting slot for the COT) during the COT based on the indication of service associated with the service parameter, as may have been received from the base station 105-d at 630.

In some cases, the indication of service associated with the service parameter, as may have been received at 630, may indicate the absence of service associated with the service parameter during the COT. In such cases, the UE 115-g may suppress monitoring of a control channel associated with the carrier during the COT based on the indicated absence of service associated with the service parameter during the COT. Alternatively, the indication of service associated with the service parameter, as may have been received at 630, may indicate the presence of service associated with the service parameter during the COT. In such cases, the UE 115-g may adapt monitoring of the control channel associated with the carrier during the COT based on the indicated presence of service associated with the service parameter during the COT. In some cases, the UE 115-g may further adapt monitoring of the control channel associated with the carrier following the COT, in some cases, based on a total duration for the COT.

At 640, the UE 115-g and the base station may communicate with the base station during the COT based on the indication of service associated with the service parameter.

Figure 7:
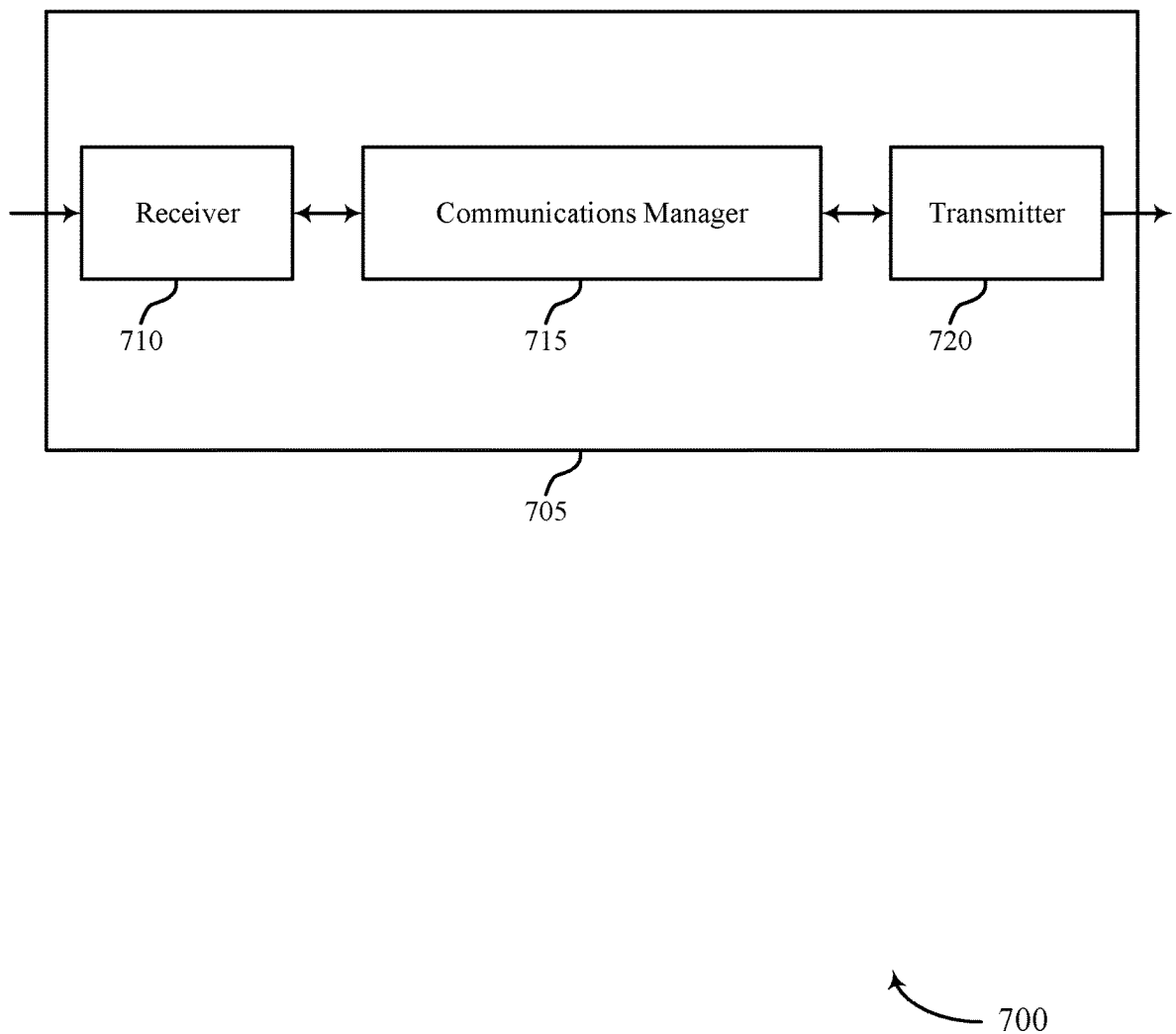
FIGS. 7 and 8 show block diagrams of devices that support techniques for configuring multiple-SCS and multi-beam direction communications in accordance with aspects of the present disclosure.

FIG. 7 shows a block diagram 700 of a device 705 that supports techniques for configuring multiple-SCS and multi-beam direction communications in accordance with aspects of the present disclosure. The device 705 may include aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for configuring multiple-SCS and multi-beam direction communications, etc.). Information may be passed on to other components of the device 705. The receiver 710 may include aspects of the transceiver 1020 described with reference to FIG. 10. The receiver 710 may utilize a single antenna or a set of antennas.

The communications manager 715 may identify a service parameter configured for the UE for a carrier associated with a shared radio frequency channel, receive, from a base station, a control message associated with a COT acquired by the base station for the shared radio frequency channel, where the control message includes an indication of service associated with the service parameter via the carrier within the COT, and determine one or more communication parameters for communicating with the base station during the COT based on the indication. The communications manager 715 may include aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some aspects, the communications manager 715, or its sub-components, may be a separate and distinct component in accordance with various aspects of the present disclosure. In some aspects, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 715 as described herein may be implemented to realize one or more potential advantages discussed herein. In some cases, a UE may receive control information from a base station via a control message communicated via one or more directional beams. Additionally or alternatively, the UE may receive a control message (e.g., an idle COT-SI message) from the base station, where the control message may indicate to one or more of the UEs that an SCS and/or beam index of the UE may not be served during an associated transmission opportunity. In this way, the UE may enter a lower power mode (e.g., not monitoring for control messages) during the transmission opportunity when it is not served by the base station, which may accordingly conserve power at the UE, among other benefits.

The transmitter 720 may transmit signals generated by other components of the device 705. In some aspects, the transmitter 720 may be collocated with a receiver 710 in a transceiver module. In some cases, the transmitter 720 may include aspects of the transceiver 1020 described with reference to FIG. 10. The transmitter 720 may utilize a single antenna or a set of antennas.

Figure 8:
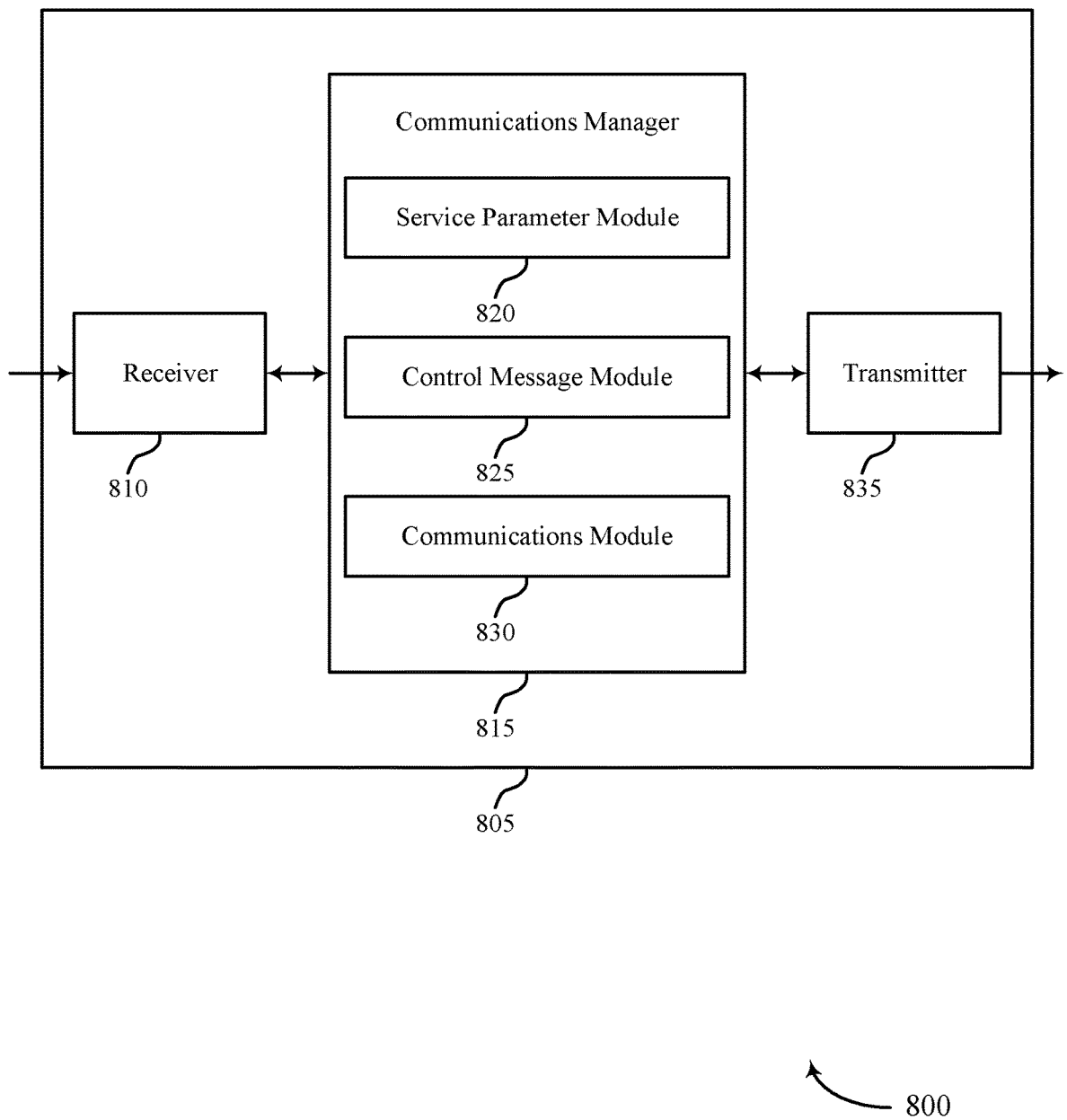

FIG. 8 shows a block diagram 800 of a device 805 that supports techniques for configuring multiple-SCS and multi-beam direction communications in accordance with aspects of the present disclosure. The device 805 may include aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to techniques for configuring multiple-SCS and multi-beam direction communications, etc.). Information may be passed on to other components of the device 805. The receiver 810 may include aspects of the transceiver 1020 described with reference to FIG. 10. The receiver 810 may utilize a single antenna or a set of antennas.

The communications manager 815 may include aspects of the communications manager 715 as described herein. The communications manager 815 may include a service parameter module 820, a control message module 825, and a communications module 830. The communications manager 815 may include aspects of the communications manager 1010 described herein.

The service parameter module 820 may identify a service parameter configured for the UE for a carrier associated with a shared radio frequency channel.

The control message module 825 may receive, from a base station, a control message associated with a COT acquired by the base station for the shared radio frequency channel, where the control message includes an indication of service associated with the service parameter via the carrier within the COT.

The communications module 830 may determine one or more communication parameters for communicating with the base station during the COT based on the indication.

The transmitter 835 may transmit signals generated by other components of the device 805. In some aspects, the transmitter 835 may be collocated with a receiver 810 in a transceiver module. For example, the transmitter 835 may include aspects of the transceiver 1020 described with reference to FIG. 10. The transmitter 835 may utilize a single antenna or a set of antennas.

Figure 9:
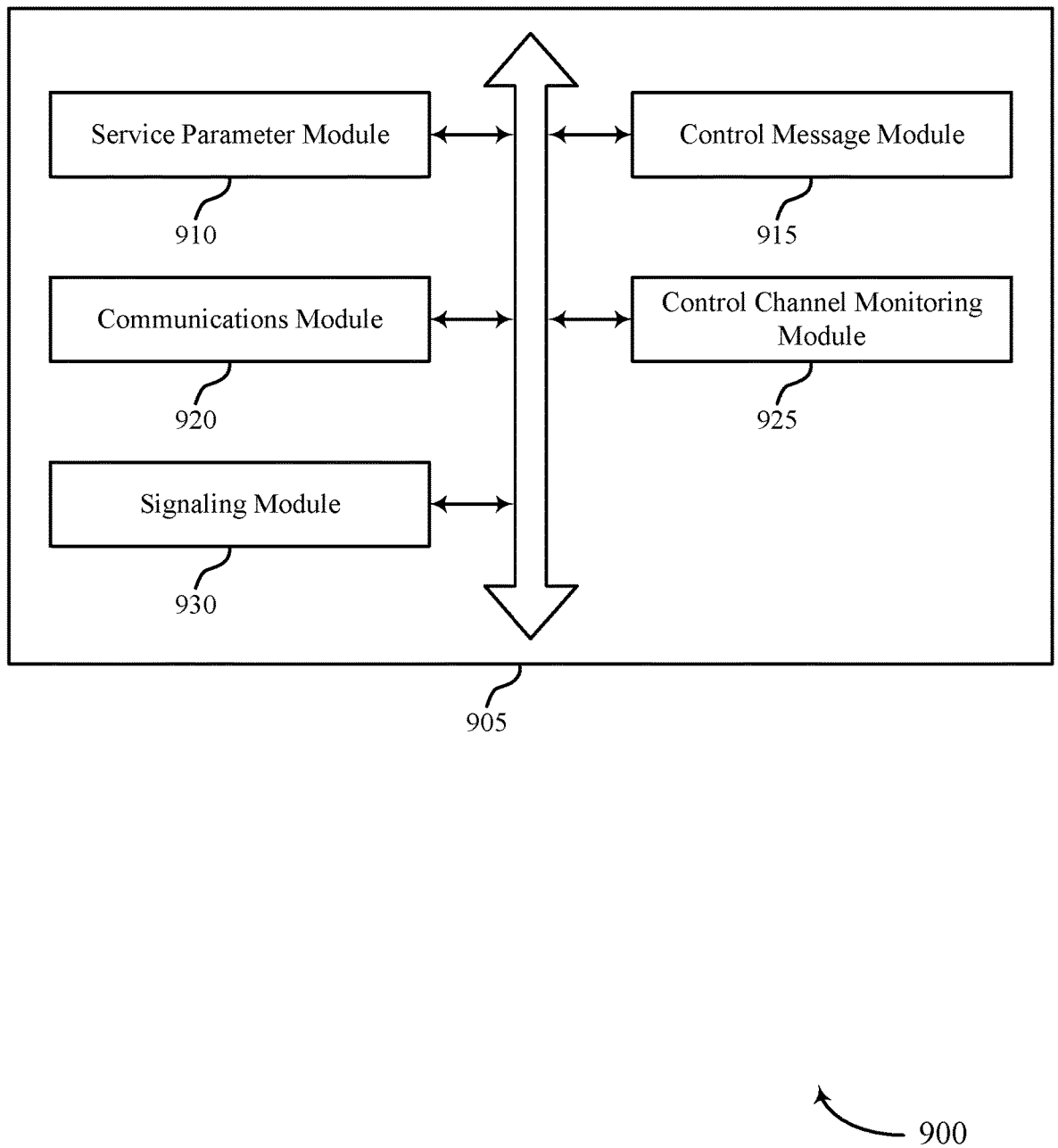
FIG. 9 shows a block diagram of a communications manager that supports techniques for configuring multiple-SCS and multi-beam direction communications in accordance with aspects of the present disclosure.

FIG. 9 shows a block diagram 900 of a communications manager 905 that supports techniques for configuring multiple-SCS and multi-beam direction communications in accordance with aspects of the present disclosure. The communications manager 905 may include aspects of a communications manager 715, a communications manager 815, or a communications manager 1010 described herein. The communications manager 905 may include a service parameter module 910, a control message module 915, a communications module 920, a control channel monitoring module 925, and a signaling module 930. Each of these modules may communicate, directly or indirectly, with one another (e.g., via one or more buses).

The service parameter module 910 may identify a service parameter configured for a UE for a carrier associated with a shared radio frequency channel. In some cases, the service parameter includes a beam configured for the UE for the carrier.

The control message module 915 may receive, from a base station, a control message associated with a COT acquired by the base station for the shared radio frequency channel, where the control message includes an indication of service associated with the service parameter via the carrier within the COT.

In some cases, the control message includes an indication of a total duration for the COT. In some cases, the control message includes an indication of a remaining duration for the COT. In some cases, the control message includes an indication of a starting point for the COT. In some cases, the control message includes an indication of a duration associated with the absence of service associated with the service parameter.

In some cases, the indication of service associated with the service parameter includes a bitmap including a set of bits corresponding to a set of respective slots of the COT, each bit of the set of bits indicating whether a respective slot of the set of respective slots includes service associated with the service parameter. In some cases, the indication of service associated with the service parameter includes a bitmap including a set of bits corresponding to a set of beams, each bit of the set of bits indicating whether a respective beam of the set of beams is serviced by the carrier during the COT. In some cases, the indication of service associated with the service parameter includes a bitmap including a set of bits corresponding to a set of SCSs, each bit of the set of bits indicating whether a respective SCS of the set of SCSs is serviced by the carrier during the COT.

In some cases, the service parameter includes an SCS configured for the UE for the carrier. In some cases, the carrier includes a first carrier and the control message is received via a second carrier, and where the second carrier is associated with a licensed radio frequency channel.

The communications module 920 may determine one or more communication parameters for communicating with the base station during the COT based on the indication.

The control channel monitoring module 925 may suppress monitoring of a control channel associated with the carrier during the COT based on the indicated absence of service associated with the service parameter during the COT. In some aspects, the control channel monitoring module 925 may adapt monitoring of a control channel associated with the carrier during the COT based on the indicated presence of service associated with the service parameter during the COT. In some aspects, the control channel monitoring module 925 may adapt monitoring of the control channel associated with the carrier following the COT, the adapting based on a total duration for the COT. In some aspects, the control channel monitoring module 925 may adapt monitoring of a control channel associated with the carrier during the COT based on receiving the signal, where receiving the control message is based on the adapted monitoring of the control channel.

In some cases, the actions performed by the control channel monitoring module 925, included in the communications manager 905, as described herein, may facilitate the processor 1040, as described with reference to FIG. 10, to more efficiently cause the UE to perform various functions. For example, the UE may receive control information from a base station via a control message communicated via one or more directional beams. Additionally or alternatively, the UE may receive a control message (e.g., an idle COT-SI message) from the base station, where the control message may indicate to one or more of the UEs that an SCS and/or beam index of the UE may not be served during an associated transmission opportunity. In this way, the UE may suppress monitoring of the control channel associated during the COT during the transmission opportunity when it is not served by the base station. This may accordingly reduce processing complexity for the processor of the UE and processing power consumption for the processor, among other benefits.

The signaling module 930 may receive, prior to receiving the control message, a signal from the base station transmitted according to the service parameter. In some cases, the signal includes a wake-up signal, a DMRS, a CSI-RS, or a combination thereof.

Figure 10:
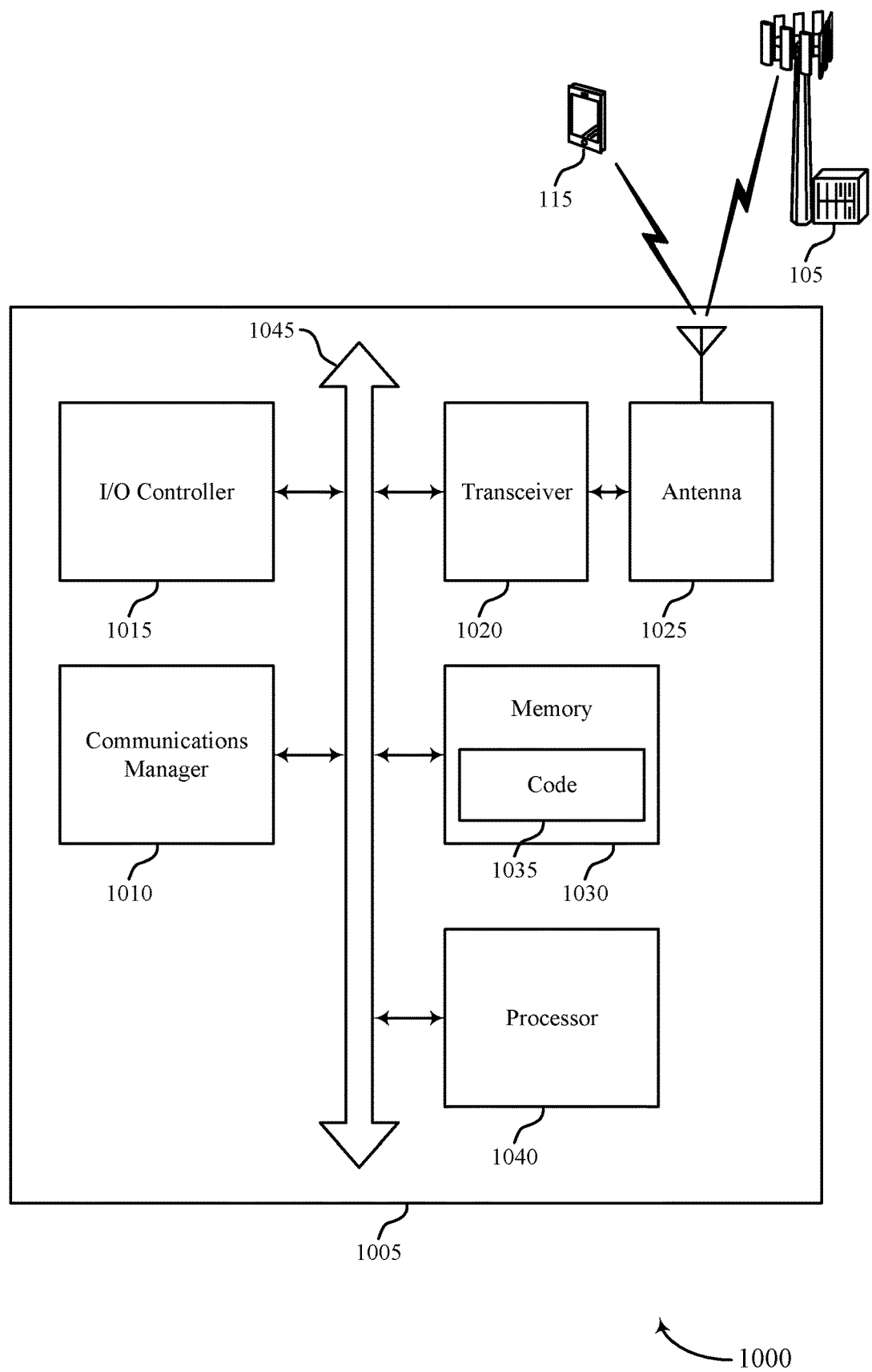
FIG. 10 shows a diagram of a system including a device that supports techniques for configuring multiple-SCS and multi-beam direction communications in accordance with aspects of the present disclosure.

FIG. 10 shows a diagram of a system 1000 including a device 1005 that supports techniques for configuring multiple-SCS and multi-beam direction communications in accordance with aspects of the present disclosure. The device 1005 may include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a service parameter configured for the UE for a carrier associated with a shared radio frequency channel, receive, from a base station, a control message associated with a COT acquired by the base station for the shared radio frequency channel, where the control message includes an indication of service associated with the service parameter via the carrier within the COT, and determine one or more communication parameters for communicating with the base station during the COT based on the indication.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. In some cases, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for configuring multiple-SCS and multi-beam direction communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
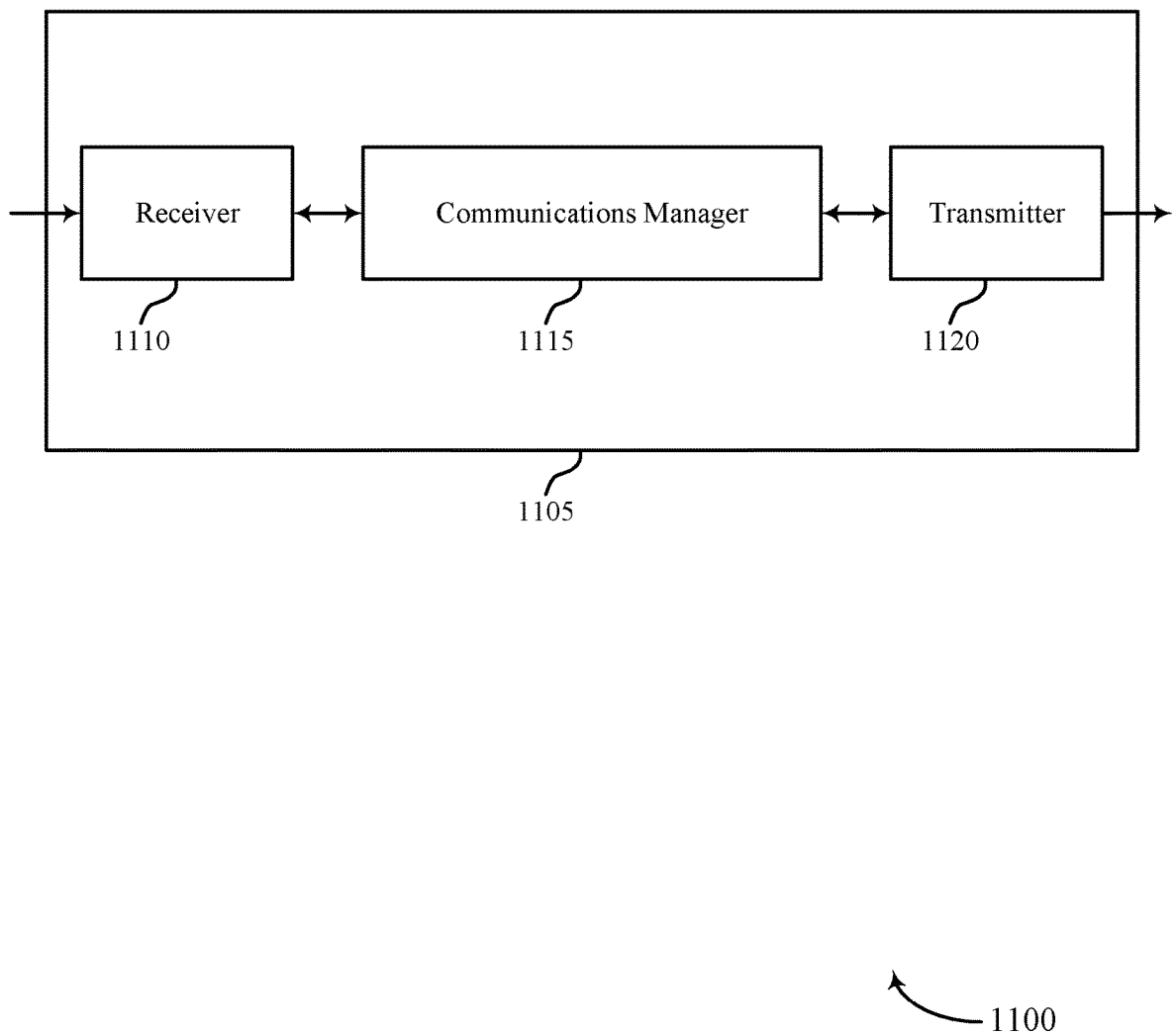
FIGS. 11 and 12 show block diagrams of devices that support techniques for configuring multiple-SCS and multi-beam direction communications in accordance with aspects of the present disclosure.

FIG. 11 shows a block diagram 1100 of a device 1105 that supports techniques for configuring multiple-SCS and multi-beam direction communications in accordance with aspects of the present disclosure. The device 1105 may include aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for configuring multiple-SCS and multi-beam direction communications, etc.). Information may be passed on to other components of the device 1105. The receiver 1110 may include aspects of the transceiver 1420 described with reference to FIG. 14. The receiver 1110 may utilize a single antenna or a set of antennas.

The communications manager 1115 may determine, for each UE of a set of UEs served by the base station via a carrier associated with a shared radio frequency channel, a service parameter of a set of service parameters configured for the each UE for communication via the carrier, perform a channel access procedure to acquire a COT of the shared radio frequency channel, and transmit, for each service parameter of the set of service parameters having at least one UE configured for communication using the each service parameter, a control message including an indication of service associated with the each service parameter within the COT. The communications manager 1115 may include aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some aspects, the communications manager 1115, or its sub-components, may be a separate and distinct component in accordance with various aspects of the present disclosure. In some aspects, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some aspects, the transmitter 1120 may be collocated with a receiver 1110 in a transceiver module. In some cases, the transmitter 1120 may include aspects of the transceiver 1420 described with reference to FIG. 14. The transmitter 1120 may utilize a single antenna or a set of antennas.

Figure 12:
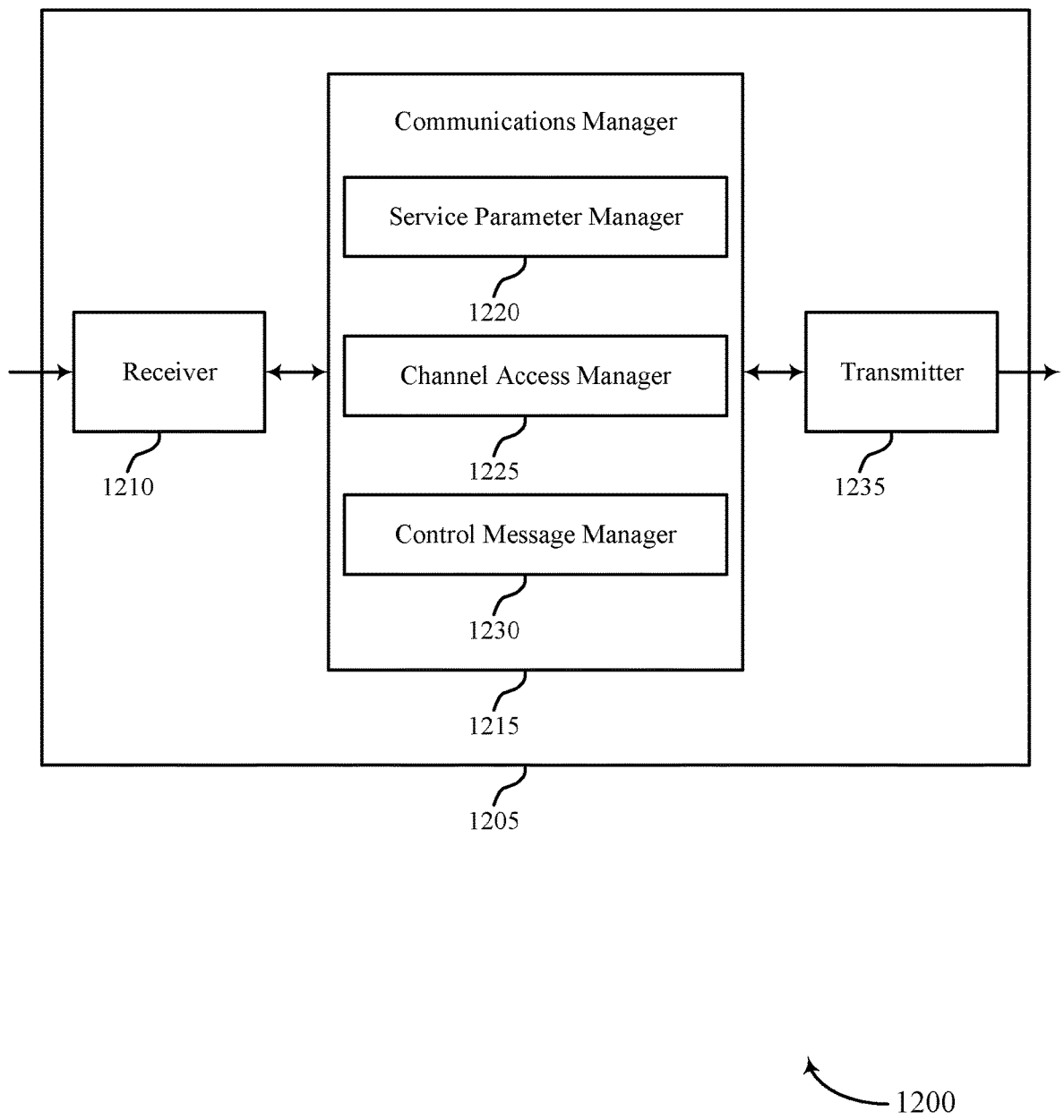

FIG. 12 shows a block diagram 1200 of a device 1205 that supports techniques for configuring multiple-SCS and multi-beam direction communications in accordance with aspects of the present disclosure. The device 1205 may include aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for configuring multiple-SCS and multi-beam direction communications, etc.). Information may be passed on to other components of the device 1205. The receiver 1210 may include aspects of the transceiver 1420 described with reference to FIG. 14. The receiver 1210 may utilize a single antenna or a set of antennas.

The communications manager 1215 may include aspects of the communications manager 1115 as described herein. The communications manager 1215 may include a service parameter manager 1220, a channel access manager 1225, and a control message manager 1230. The communications manager 1215 may include aspects of the communications manager 1410 described herein.

The service parameter manager 1220 may determine, for each UE of a set of UEs served by the base station via a carrier associated with a shared radio frequency channel, a service parameter of a set of service parameters configured for the each UE for communication via the carrier.

The channel access manager 1225 may perform a channel access procedure to acquire a COT of the shared radio frequency channel.

The control message manager 1230 may transmit, for each service parameter of the set of service parameters having at least one UE configured for communication using the each service parameter, a control message including an indication of service associated with the each service parameter within the COT.

The transmitter 1235 may transmit signals generated by other components of the device 1205. In some aspects, the transmitter 1235 may be collocated with a receiver 1210 in a transceiver module. In some cases, the transmitter 1235 may include aspects of the transceiver 1420 described with reference to FIG. 14. The transmitter 1235 may utilize a single antenna or a set of antennas.

Figure 13:
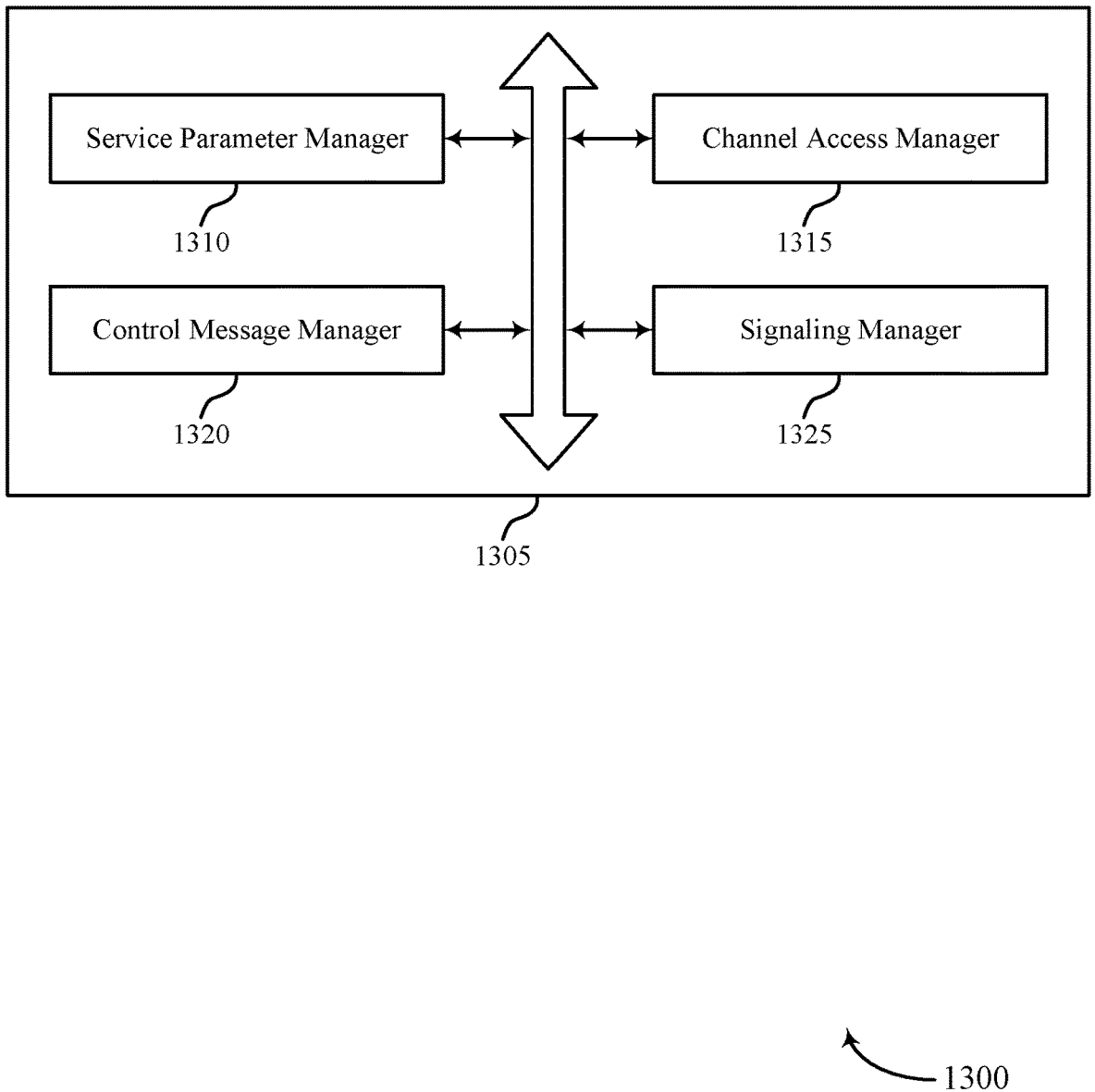
FIG. 13 shows a block diagram of a communications manager that supports techniques for configuring multiple-SCS and multi-beam direction communications in accordance with aspects of the present disclosure.

FIG. 13 shows a block diagram 1300 of a communications manager 1305 that supports techniques for configuring multiple-SCS and multi-beam direction communications in accordance with aspects of the present disclosure. The communications manager 1305 may include aspects of a communications manager 1115, a communications manager 1215, or a communications manager 1410 described herein. The communications manager 1305 may include a service parameter manager 1310, a channel access manager 1315, a control message manager 1320, and a signaling manager 1325. Each of these modules may communicate, directly or indirectly, with one another (e.g., via one or more buses).

The service parameter manager 1310 may determine, for each UE of a set of UEs served by the base station via a carrier associated with a shared radio frequency channel, a service parameter of a set of service parameters configured for the each UE for communication via the carrier. In some cases, the set of service parameters corresponds to a set of SCSs. In some cases, the set of service parameters corresponds to a set of beams.

The channel access manager 1315 may perform a channel access procedure to acquire a COT of the shared radio frequency channel.

The control message manager 1320 may transmit, for each service parameter of the set of service parameters having at least one UE configured for communication using the each service parameter, a control message including an indication of service associated with the each service parameter within the COT. In some aspects, for the each service parameter of the set of service parameters, the indication of service associated with the each service parameter includes a bitmap including a set of bits corresponding to a set of respective slots of the COT, each bit of the set of bits indicating whether a respective slot of the set of respective slots includes service associated with the each service parameter.

In some aspects, for the each service parameter of the set of service parameters, the control message includes an indication of a total duration for the COT. In some aspects, for the each service parameter of the set of service parameters, the control message includes an indication of a remaining duration for the COT. In some aspects, for the each service parameter of the set of service parameters, the control message includes an indication of a starting point for the COT.

In some cases, the indication of service associated with the service parameter includes a bitmap including a set of bits corresponding to a set of respective beams, each bit of the set of bits indicating whether a respective beam of the set of beams is serviced by the carrier during the COT. In some cases, the carrier includes a first carrier and the control message is transmitted via a second carrier, and where the second carrier is associated with a licensed radio frequency channel. In some cases, the control message includes a bitmap including a set of bits corresponding to a set of SCSs, each bit of the set of bits indicating whether a respective SCS of the set of SCSs is serviced by the carrier during the COT.

The signaling manager 1325 may transmit, prior to transmitting the control message for the each service parameter of the set of service parameters, a signal according to the each service parameter. In some cases, the signal includes a wake-up signal, a DMRS, a CSI-RS, or a combination thereof.

Figure 14:
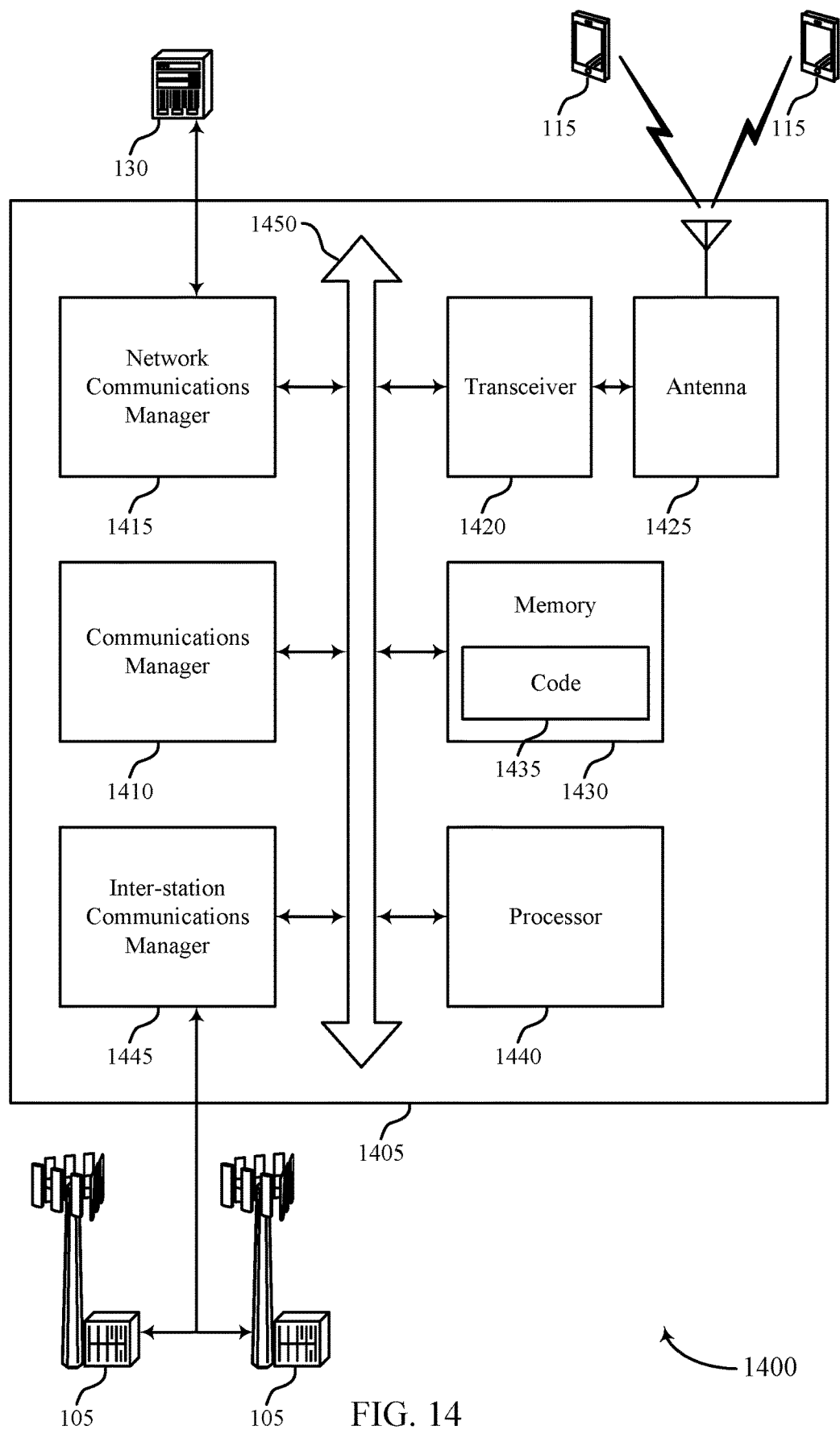
FIG. 14 shows a diagram of a system including a device that supports techniques for configuring multiple-SCS and multi-beam direction communications in accordance with aspects of the present disclosure.

FIG. 14 shows a diagram of a system 1400 including a device 1405 that supports techniques for configuring multiple-SCS and multi-beam direction communications in accordance with aspects of the present disclosure. The device 1405 may include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine, for each UE of a set of UEs served by the base station via a carrier associated with a shared radio frequency channel, a service parameter of a set of service parameters configured for the each UE for communication via the carrier, perform a channel access procedure to acquire a COT of the shared radio frequency channel, and transmit, for each service parameter of the set of service parameters having at least one UE configured for communication using the each service parameter, a control message including an indication of service associated with the each service parameter within the COT.

The network communications manager 1415 may manage communications with the core network (e.g., via one or more wired backhaul links). According to some aspects, the network communications manager 1415 may manage the transfer of data communications for client devices, such as one or more UEs 115.

The transceiver 1420 may communicate bi-directionally, via one or more antennas, wired, or wireless links as described above. According to some aspects, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for configuring multiple-SC S and multi-beam direction communications).

The inter-station communications manager 1445 may manage communications with other base station 105, and may include a controller or scheduler for controlling communications with UEs 115 in cooperation with other base stations 105. According to some aspects, the inter-station communications manager 1445 may coordinate scheduling for transmissions to UEs 115 for various interference mitigation techniques such as beamforming or joint transmission. In some aspects, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
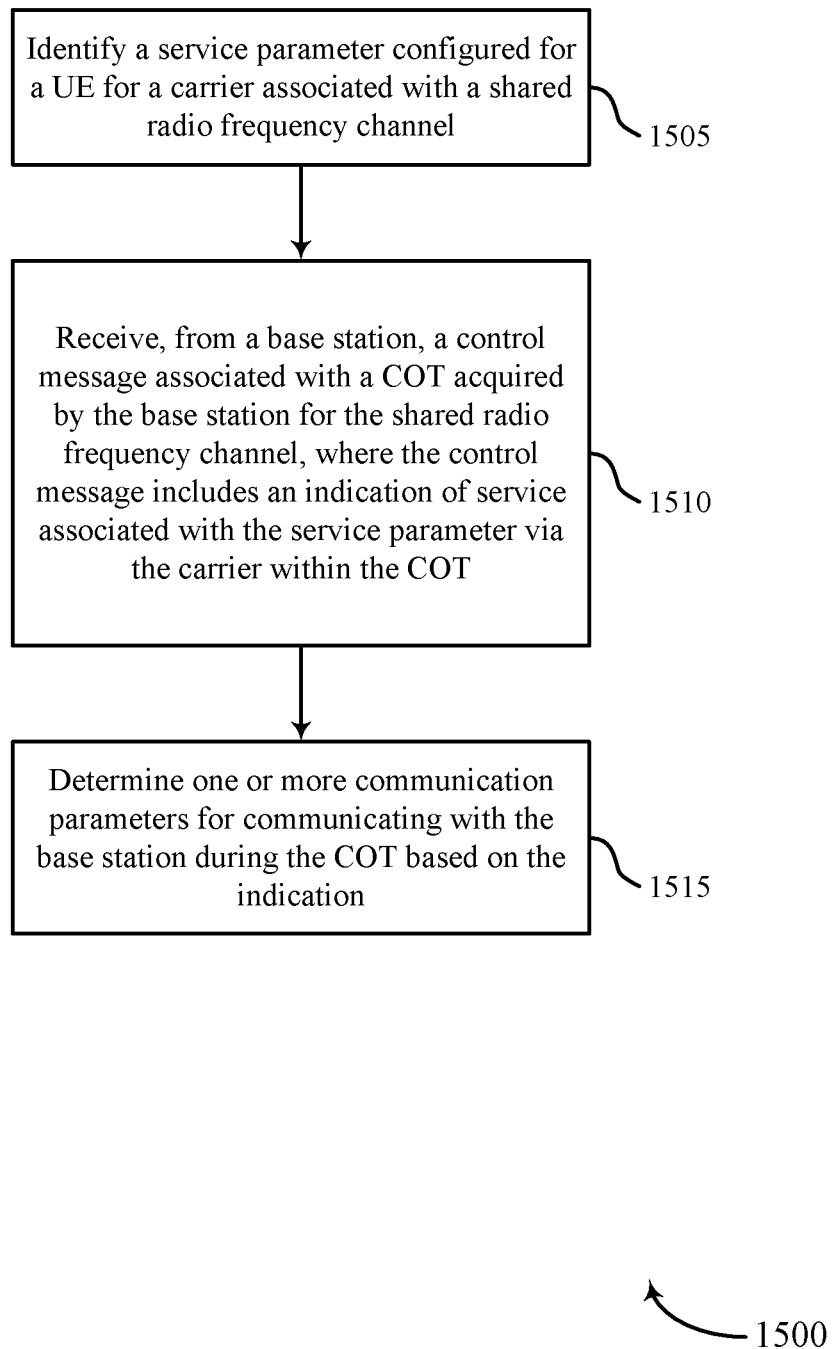
FIGS. 15 through 18 show flowcharts illustrating methods that support techniques for configuring multiple-SCS and multi-beam direction communications in accordance with aspects of the present disclosure.

FIG. 15 shows a flowchart illustrating a method 1500 that supports techniques for configuring multiple-SCS and multi-beam direction communications in accordance with aspects of the present disclosure. The operations of method 1500 may be implemented by a UE 115 or its components as described herein. According to some aspects, the operations of method 1500 may be performed by a communications manager as described with reference to FIGS. 7 through 10. In some aspects, a UE may execute a set of instructions to control the functional elements of the UE to perform the functions described below. Additionally or alternatively, a UE may perform aspects of the functions described below using special-purpose hardware.

At 1505, the UE may identify a service parameter configured for the UE for a carrier associated with a shared radio frequency channel. The operations of 1505 may be performed according to the methods described herein. In some aspects, aspects of the operations of 1505 may be performed by a service parameter module as described with reference to FIGS. 7 through 10.

At 1510, the UE may receive, from a base station, a control message associated with a COT acquired by the base station for the shared radio frequency channel, where the control message includes an indication of service associated with the service parameter via the carrier within the COT. The operations of 1510 may be performed according to the methods described herein. In some aspects, aspects of the operations of 1510 may be performed by a control message module as described with reference to FIGS. 7 through 10.

At 1515, the UE may determine one or more communication parameters for communicating with the base station during the COT based on the indication. The operations of 1515 may be performed according to the methods described herein. In some aspects, aspects of the operations of 1515 may be performed by a communications module as described with reference to FIGS. 7 through 10.

Figure 16:
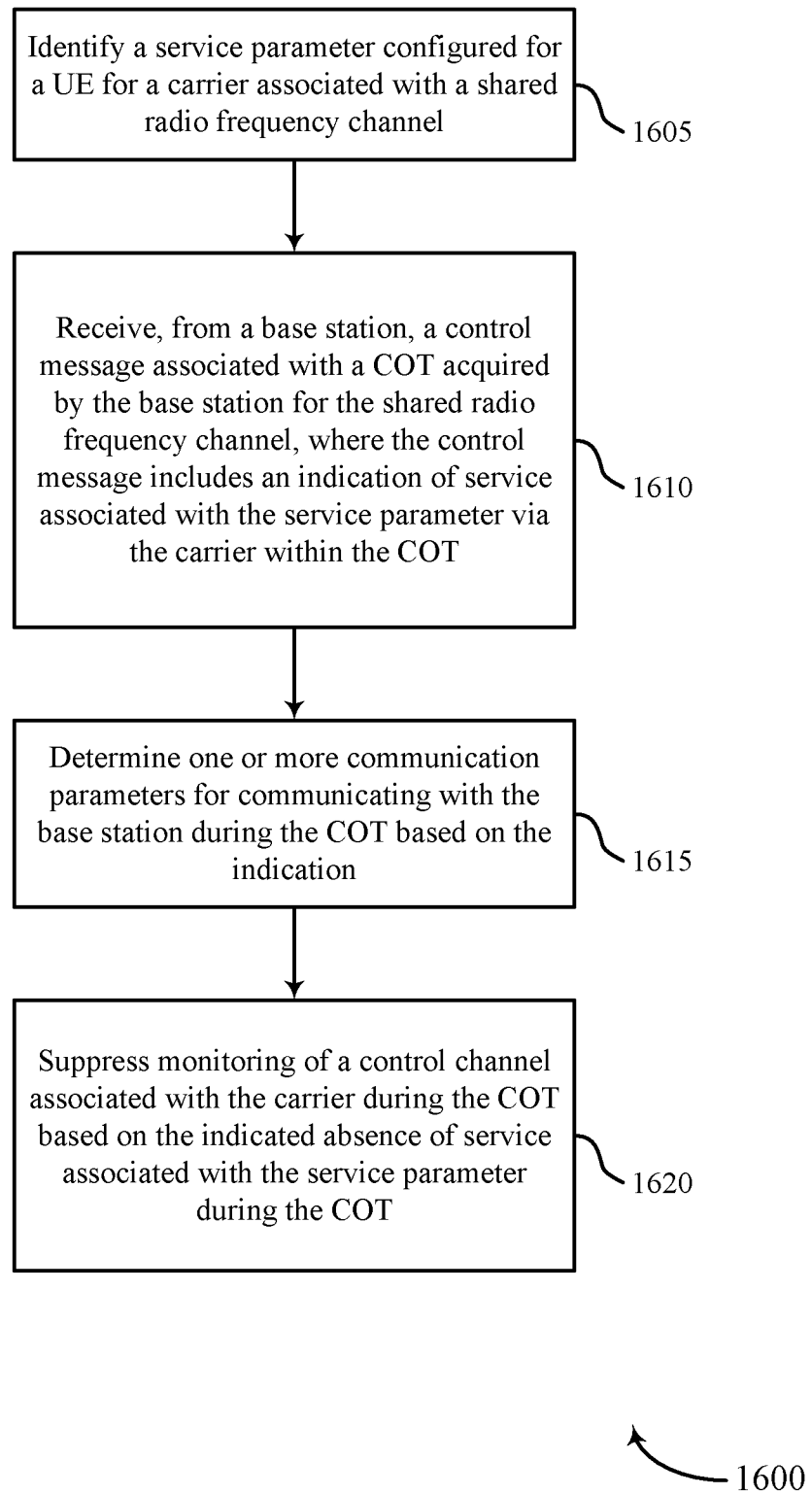

FIG. 16 shows a flowchart illustrating a method 1600 that supports techniques for configuring multiple-SCS and multi-beam direction communications in accordance with aspects of the present disclosure. The operations of method 1600 may be implemented by a UE 115 or its components as described herein. According to some aspects, the operations of method 1600 may be performed by a communications manager as described with reference to FIGS. 7 through 10. In some aspects, a UE may execute a set of instructions to control the functional elements of the UE to perform the functions described below. Additionally or alternatively, a UE may perform aspects of the functions described below using special-purpose hardware.

At 1605, the UE may identify a service parameter configured for the UE for a carrier associated with a shared radio frequency channel. The operations of 1605 may be performed according to the methods described herein. In some aspects, aspects of the operations of 1605 may be performed by a service parameter module as described with reference to FIGS. 7 through 10.

At 1610, the UE may receive, from a base station, a control message associated with a COT acquired by the base station for the shared radio frequency channel, where the control message includes an indication of service associated with the service parameter via the carrier within the COT. The operations of 1610 may be performed according to the methods described herein. In some aspects, aspects of the operations of 1610 may be performed by a control message module as described with reference to FIGS. 7 through 10.

At 1615, the UE may determine one or more communication parameters for communicating with the base station during the COT based on the indication. The operations of 1615 may be performed according to the methods described herein. In some aspects, aspects of the operations of 1615 may be performed by a communications module as described with reference to FIGS. 7 through 10.

At 1620, the UE may suppress monitoring of a control channel associated with the carrier during the COT based on the indicated absence of service associated with the service parameter during the COT. The operations of 1620 may be performed according to the methods described herein. In some aspects, aspects of the operations of 1620 may be performed by a control channel monitoring module as described with reference to FIGS. 7 through 10.

Figure 17:
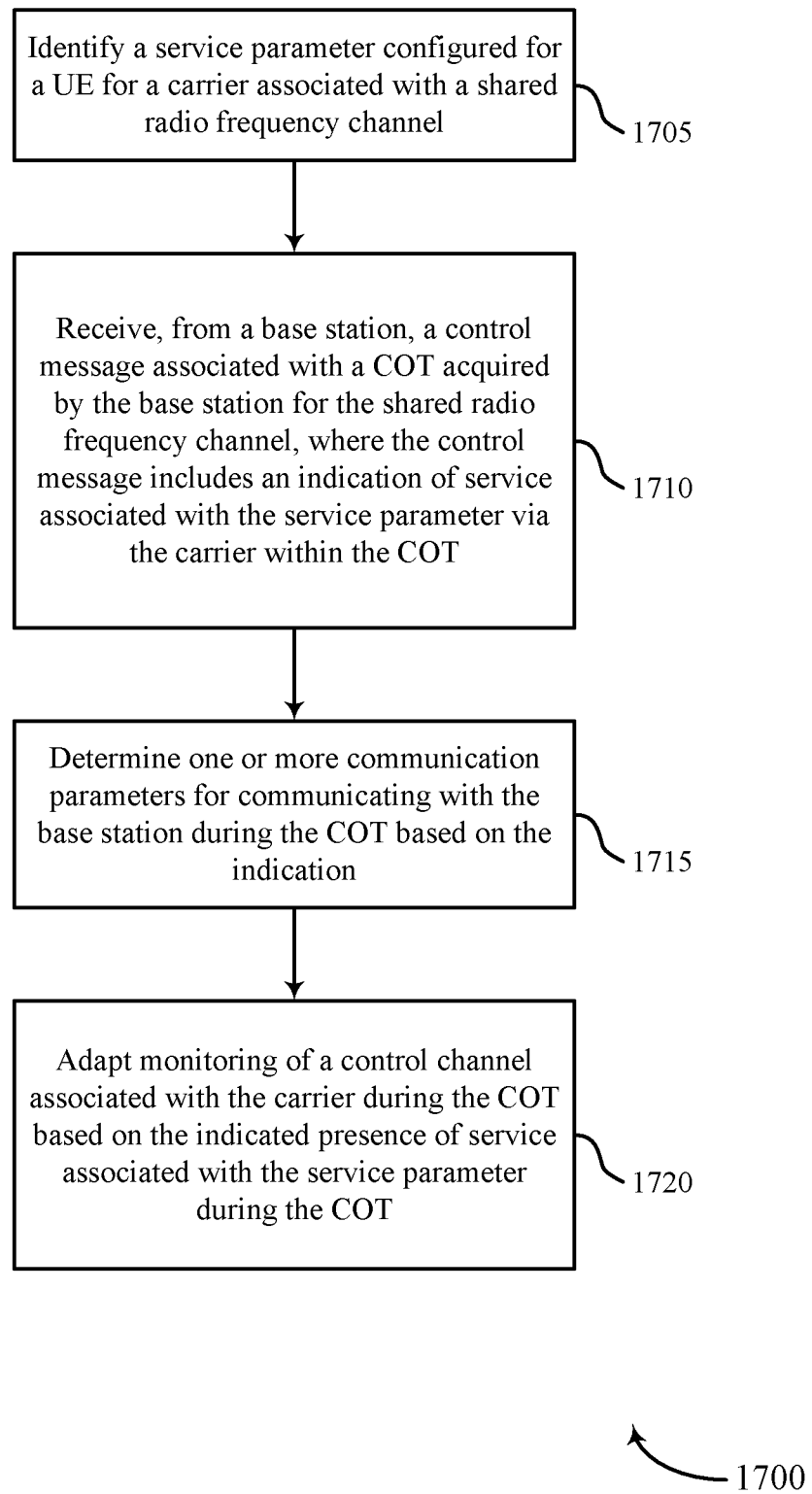

FIG. 17 shows a flowchart illustrating a method 1700 that supports techniques for configuring multiple-SCS and multi-beam direction communications in accordance with aspects of the present disclosure. The operations of method 1700 may be implemented by a UE 115 or its components as described herein. According to some aspects, the operations of method 1700 may be performed by a communications manager as described with reference to FIGS. 7 through 10. In some aspects, a UE may execute a set of instructions to control the functional elements of the UE to perform the functions described below. Additionally or alternatively, a UE may perform aspects of the functions described below using special-purpose hardware.

At 1705, the UE may identify a service parameter configured for the UE for a carrier associated with a shared radio frequency channel. The operations of 1705 may be performed according to the methods described herein. In some aspects, aspects of the operations of 1705 may be performed by a service parameter module as described with reference to FIGS. 7 through 10.

At 1710, the UE may receive, from a base station, a control message associated with a COT acquired by the base station for the shared radio frequency channel, where the control message includes an indication of service associated with the service parameter via the carrier within the COT. The operations of 1710 may be performed according to the methods described herein. In some aspects, aspects of the operations of 1710 may be performed by a control message module as described with reference to FIGS. 7 through 10.

At 1715, the UE may determine one or more communication parameters for communicating with the base station during the COT based on the indication. The operations of 1715 may be performed according to the methods described herein. In some aspects, aspects of the operations of 1715 may be performed by a communications module as described with reference to FIGS. 7 through 10.

At 1720, the UE may adapt monitoring of a control channel associated with the carrier during the COT based on the indicated presence of service associated with the service parameter during the COT. The operations of 1720 may be performed according to the methods described herein. In some aspects, aspects of the operations of 1720 may be performed by a control channel monitoring module as described with reference to FIGS. 7 through 10.

Figure 18:
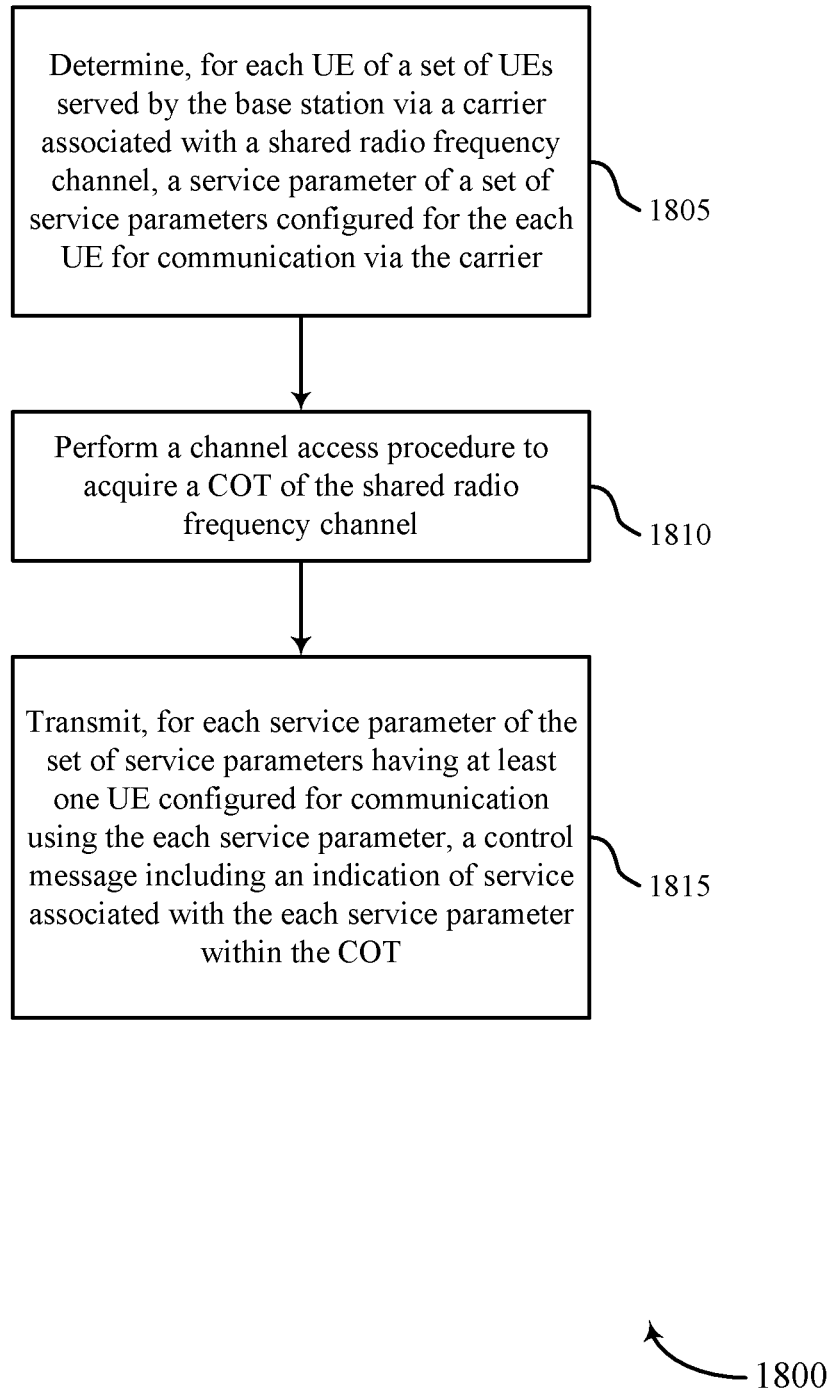

FIG. 18 shows a flowchart illustrating a method 1800 that supports techniques for configuring multiple-SCS and multi-beam direction communications in accordance with aspects of the present disclosure. The operations of method 1800 may be implemented by a base station 105 or its components as described herein. According to some aspects, the operations of method 1800 may be performed by a communications manager as described with reference to FIGS. 11 through 14. In some aspects, a base station may execute a set of instructions to control the functional elements of the base station to perform the functions described below. Additionally or alternatively, a base station may perform aspects of the functions described below using special-purpose hardware.

At 1805, the base station may determine, for each UE of a set of UEs served by the base station via a carrier associated with a shared radio frequency channel, a service parameter of a set of service parameters configured for the each UE for communication via the carrier. The operations of 1805 may be performed according to the methods described herein. In some aspects, aspects of the operations of 1805 may be performed by a service parameter manager as described with reference to FIGS. 11 through 14.

At 1810, the base station may perform a channel access procedure to acquire a COT of the shared radio frequency channel. The operations of 1810 may be performed according to the methods described herein. In some aspects, aspects of the operations of 1810 may be performed by a channel access manager as described with reference to FIGS. 11 through 14.

At 1815, the base station may transmit, for each service parameter of the set of service parameters having at least one UE configured for communication using the each service parameter, a control message including an indication of service associated with the each service parameter within the COT. The operations of 1815 may be performed according to the methods described herein. In some aspects, aspects of the operations of 1815 may be performed by a control message manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier FDMA (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various aspects. A pico cell, in some cases, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. According to some aspects, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. According to some aspects, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication implemented by a user equipment (UE), comprising:
    identifying a subcarrier spacing configured for the UE for a carrier associated with a shared radio frequency channel;
    receiving, from a network device, a control message associated with a channel occupancy time acquired by the network device for the shared radio frequency channel, wherein the control message comprises an indication of service for a plurality of subcarrier spacings serviced by the carrier during the channel occupancy time, and wherein the indication of service for the plurality of subcarrier spacings comprises a respective indication of a presence or absence of service for each subcarrier spacing of the plurality of subcarrier spacings for each slot of a plurality of slots of the channel occupancy time;
    determining, based at least in part on the indication of service for the plurality of subcarrier spacings, that the plurality of subcarrier spacings serviced by the carrier during the channel occupancy time comprises the subcarrier spacing configured for the UE; and
    determining one or more communication parameters for communicating with the network device during the channel occupancy time based at least in part on the respective indication of the presence or absence of service for the subcarrier spacing configured for the UE.

2. The method of claim 1, wherein the respective indication of the presence or absence of service for the subcarrier spacing configured for the UE indicates an absence of service associated with the subcarrier spacing configured for the UE during the channel occupancy time, the method further comprising:
    suppressing monitoring of a control channel associated with the carrier during the channel occupancy time based at least in part on the indicated absence of service associated with the subcarrier spacing configured for the UE during the channel occupancy time.

3. The method of claim 2, wherein the control message comprises an indication of a duration associated with the absence of service associated with the subcarrier spacing configured for the UE.

4. The method of claim 1, wherein the respective indication of the presence or absence of service for the subcarrier spacing configured for the UE indicates a presence of service associated with the subcarrier spacing configured for the UE during the channel occupancy time, the method further comprising:
    adapting monitoring of a control channel associated with the carrier during the channel occupancy time based at least in part on the indicated presence of service for the subcarrier spacing configured for the UE during the channel occupancy time.

5. The method of claim 4, further comprising:
    adapting monitoring of the control channel associated with the carrier following the channel occupancy time, the adapting based at least in part on a total duration for the channel occupancy time.

6. The method of claim 4, wherein adapting monitoring of the control channel comprises switching from mini-slot level monitoring to slot level monitoring.

7. The method of claim 1, wherein the respective indication of the presence or absence of service for_each subcarrier spacing of the plurality of subcarrier spacings for each slot of the plurality of slots of the channel occupancy time comprises a respective bitmap including a plurality of bits corresponding to the plurality of slots of the channel occupancy time, each bit of the plurality of bits indicating a presence or absence of service associated with the respective subcarrier spacing for the slot corresponding to the respective bit.

8. The method of claim 1, wherein the carrier comprises a first carrier and the control message is received via a second carrier, and wherein the second carrier is associated with a licensed radio frequency channel.

9. The method of claim 1, wherein the control message comprises an indication of a total duration for the channel occupancy time, an indication of a remaining duration for the channel occupancy time, an indication of a starting point for the channel occupancy time, or a combination thereof.

10. The method of claim 1, further comprising:
    receiving, prior to receiving the control message, a signal from the network device transmitted according to the subcarrier spacing configured for the UE; and
    adapting monitoring of a control channel associated with the carrier during the channel occupancy time based at least in part on receiving the signal, wherein the receiving the control message is based at least in part on the adapted monitoring of the control channel.

11. The method of claim 10, wherein the signal comprises a wake-up signal, a demodulation reference signal, a channel state information reference signal, or a combination thereof.

12. A method for wireless communication implemented by a network device, comprising:
    determining, for each user equipment (UE) of a set of UEs served by the network device via a carrier associated with a shared radio frequency channel, a subcarrier spacing configured for the each UE for communication via the carrier;
    performing a channel access procedure to acquire a channel occupancy time of the shared radio frequency channel; and
    transmitting a control message associated with the channel occupancy time, wherein the control message comprises an indication of service for a plurality of subcarrier spacings serviced by the carrier during the channel occupancy time, and wherein the indication of service for the plurality of subcarrier spacings comprises a respective indication of a presence or absence of service for each subcarrier spacing of the plurality of subcarrier spacings for each slot of a plurality of slots of the channel occupancy time.

13. The method of claim 12, wherein the respective indication of the presence or absence of service for each subcarrier spacing of the plurality of subcarrier spacings for each slot of the plurality of slots of the channel occupancy time comprises a bitmap including a plurality of bits corresponding to the plurality of slots of the channel occupancy time, each bit of the plurality of bits indicating whether a presence or absence of service associated with the respective subcarrier spacing for the slot corresponding to the respective bit.

14. The method of claim 12, wherein the carrier comprises a first carrier and the control message is transmitted via a second carrier, and wherein the second carrier is associated with a licensed radio frequency channel.

15. The method of claim 12, wherein the control message comprises an indication of a total duration for the channel occupancy time, an indication of a remaining duration for the channel occupancy time, an indication of a starting point for the channel occupancy time, or a combination thereof.

16. The method of claim 12, further comprising:
transmitting, prior to the transmitting the control message, a signal according to the each subcarrier spacing, wherein the signal comprises a wake-up signal, a demodulation reference signal, a channel state information reference signal, or a combination thereof.

17. An apparatus for wireless communication implemented by a user equipment (UE), comprising:
one or more processors; and
one or more memories coupled with the one or more processors, wherein the one or more memories comprise instructions executable by the one or more processors to cause the apparatus to:
identify a subcarrier spacing configured for the UE for a carrier associated with a shared radio frequency channel;
receive, from a network device, a control message associated with a channel occupancy time acquired by the network device for the shared radio frequency channel, wherein the control message comprises an indication of service for a plurality of subcarrier spacings serviced by the carrier during the channel occupancy time, and wherein the indication of service for the plurality of subcarrier spacings comprises a respective indication of a presence or absence of service for each subcarrier spacing of the plurality of subcarrier spacings for each slot of a plurality of slots of the channel occupancy time;
determine, based at least in part on the indication of service for the plurality of subcarrier spacings, that the plurality of subcarrier spacings serviced by the carrier during the channel occupancy time comprises the subcarrier spacing configured for the UE; and
determine one or more communication parameters for communicating with the network device during the channel occupancy time based at least in part on the respective indication of the presence or absence of service for the of subcarrier spacing configured for the UE.

18. The apparatus of claim 17, wherein the respective indication of the presence or absence of service for the subcarrier spacing configured for the UE indicates an absence of service associated with the subcarrier spacing configured for the UE during the channel occupancy time, and
wherein the instructions are further executable by the one or more processors to cause the apparatus to suppress monitoring of a control channel associated with the carrier during the channel occupancy time based at least in part on the indicated absence of service associated with the subcarrier spacing configured for the UE during the channel occupancy time.

19. The apparatus of claim 17, wherein the respective indication of the presence or absence of service for the subcarrier spacing configured for the UE indicates a presence of service for the subcarrier spacing configured for the UE during the channel occupancy time, and
wherein the instructions are further executable by the one or more processors to cause the apparatus to adapt monitoring of a control channel associated with the carrier during the channel occupancy time based at least in part on the indicated presence of service associated with the subcarrier spacing configured for the UE during the channel occupancy time.

20. The apparatus of claim 19, wherein adapting monitoring of the control channel comprises switching from mini-slot level monitoring to slot level monitoring.

21. The apparatus of claim 17, wherein the respective indication of the presence or absence of service for each subcarrier spacing of the plurality of subcarrier spacings for each slot of the plurality of slots of the channel occupancy time comprises a respective bitmap including a plurality of bits corresponding to the plurality of slots of the channel occupancy time, each bit of the plurality of bits indicating a presence or absence of service associated with the respective subcarrier spacing for the slot corresponding to the respective bit.

22. An apparatus for wireless communication implemented by a network device, comprising:
one or more processors; and
one or more memories coupled with the one or more processors, wherein the one or more memories comprise instructions executable by the one or more processors to cause the apparatus to:
determine, for each user equipment (UE) of a set of UEs served by the network device via a carrier associated with a shared radio frequency channel, a subcarrier spacing configured for the each UE for communication via the carrier;
perform a channel access procedure to acquire a channel occupancy time of the shared radio frequency channel; and
transmit a control message associated with the channel occupancy time, wherein the control message comprises an indication of service for a plurality of subcarrier spacings serviced by the carrier during the channel occupancy time, and wherein the indication of service for the plurality of subcarrier spacings comprises a respective indication of a presence or absence of service for each subcarrier spacing of the plurality of subcarrier spacings for each slot of a plurality of slots of the channel occupancy time.

23. The apparatus of claim 22, wherein the respective indication of the presence or absence of service for each subcarrier spacing of the plurality of subcarrier spacings for each slot of the plurality of slots of the channel occupancy time comprises a bitmap including a plurality of bits corresponding to the plurality of slots of the channel occupancy time, each bit of the plurality of bits indicating a presence or absence of service associated with the respective subcarrier spacing for the slot corresponding to the respective bit.

* * * * *